United States Patent [19]

Matsuyama et al.

[11] Patent Number: 5,052,540
[45] Date of Patent: Oct. 1, 1991

[54] ROTARY TRANSFER SYSTEM

[75] Inventors: Taizo Matsuyama; Kaname Goto; Masao Hyuga; Akira Ozawa; Tomomi Kousaka; Minoru Asuma; Jyun Watari, all of Sayama, Japan

[73] Assignee: Honda Giken Kogyo Kabushiki Kaisha, Tokyo, Japan

[21] Appl. No.: 382,421

[22] Filed: Jul. 20, 1989

[30] Foreign Application Priority Data

Jul. 26, 1988 [JP] Japan .................. 63-186269
Jul. 26, 1988 [JP] Japan .................. 63-186270
Sep. 12, 1988 [JP] Japan .................. 63-228029

[51] Int. Cl.⁵ .............................. B65G 47/00
[52] U.S. Cl. ...................... 198/346.1; 198/409; 198/465.1; 29/33 P; 414/222
[58] Field of Search .......... 414/222, 223, 225; 198/346.1, 409, 406, 465.1; 29/33 P, 563, 564, 38 C

[56] References Cited

U.S. PATENT DOCUMENTS

| | | | |
|---|---|---|---|
| 2,953,069 | 9/1960 | Smith | 29/38 C X |
| 4,285,233 | 8/1981 | Swis | 198/465.1 X |
| 4,637,108 | 1/1987 | Murata et al. | 198/465.1 X |
| 4,685,850 | 8/1987 | Ohta et al. | 414/223 X |
| 4,763,391 | 8/1988 | Yoshioka et al. | 29/33 P |
| 4,781,512 | 11/1988 | Ohta et al. | 198/465.1 X |
| 4,955,463 | 9/1990 | Honma et al. | 414/222 X |

FOREIGN PATENT DOCUMENTS

| | | |
|---|---|---|
| 50-26177 | 3/1975 | Japan . |
| 0038386 | 3/1977 | Japan ............... 29/563 |
| 53-42847 | 10/1978 | Japan . |
| 54-82782 | 7/1979 | Japan . |
| 59-78042 | 5/1984 | Japan . |

*Primary Examiner*—Frank E. Werner
*Assistant Examiner*—James T. Eller

[57] ABSTRACT

A rotary transfer system includes an attitude converting station for automatically changing the attitude of a pallet with a workpiece supported thereon into a predetermined attitude, at least two machining stations for machining the workpiece with machine tools, and a feeder for feeding the pallet along an arcuate feed path from the attitude converting station successively to the machining stations. The annular feed path has a pair of upper and lower arcuate movable rails disposed in each of the attitude converting station and the machining stations, and a pair of upper and lower arcuate fixed rails aligned with the movable rails.

7 Claims, 13 Drawing Sheets

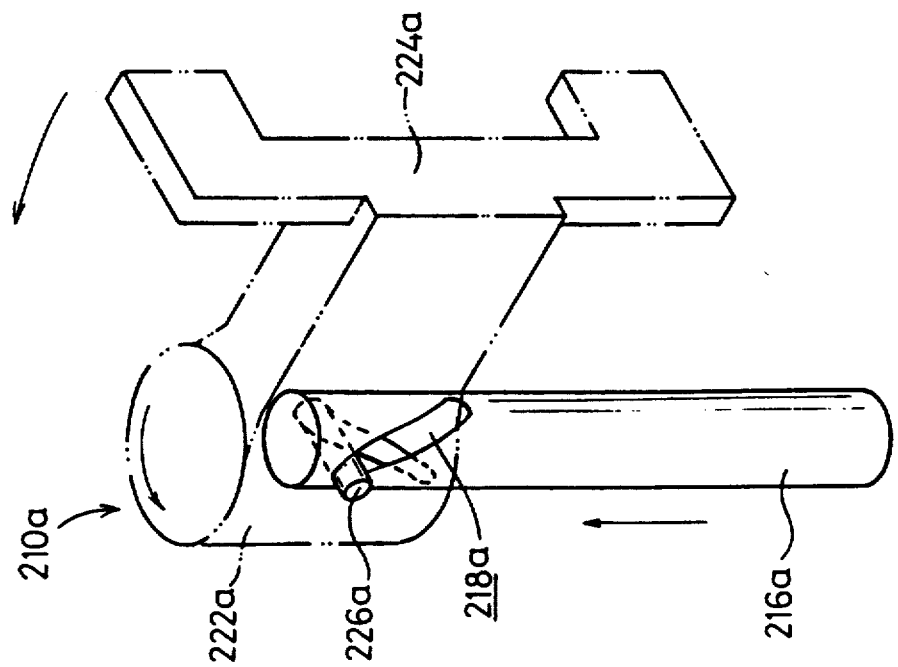
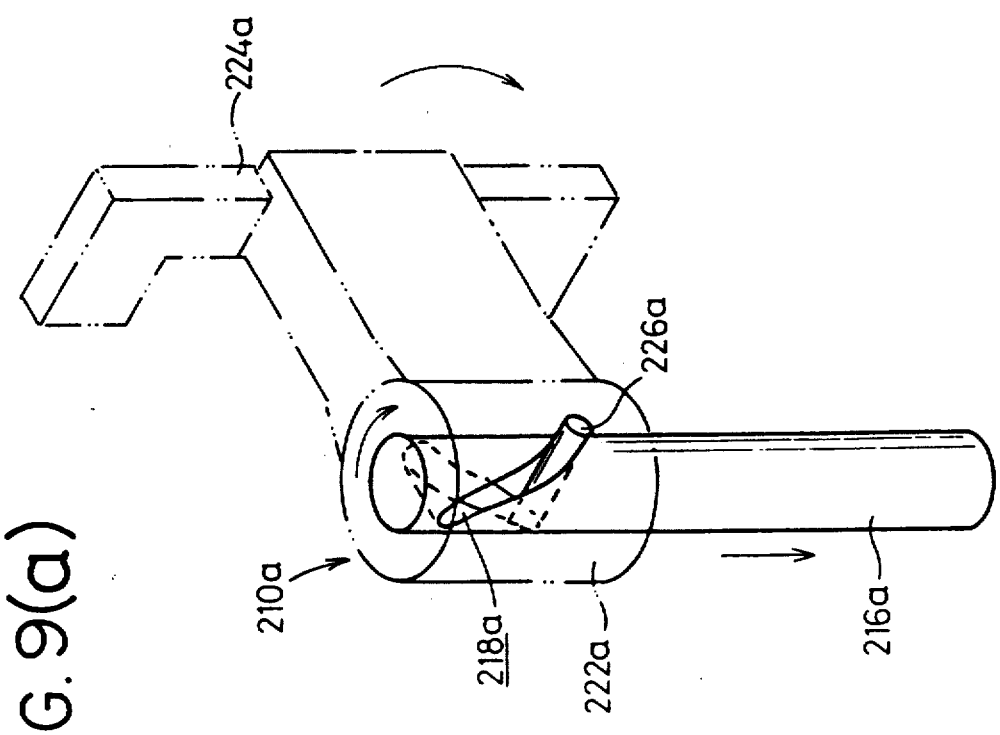

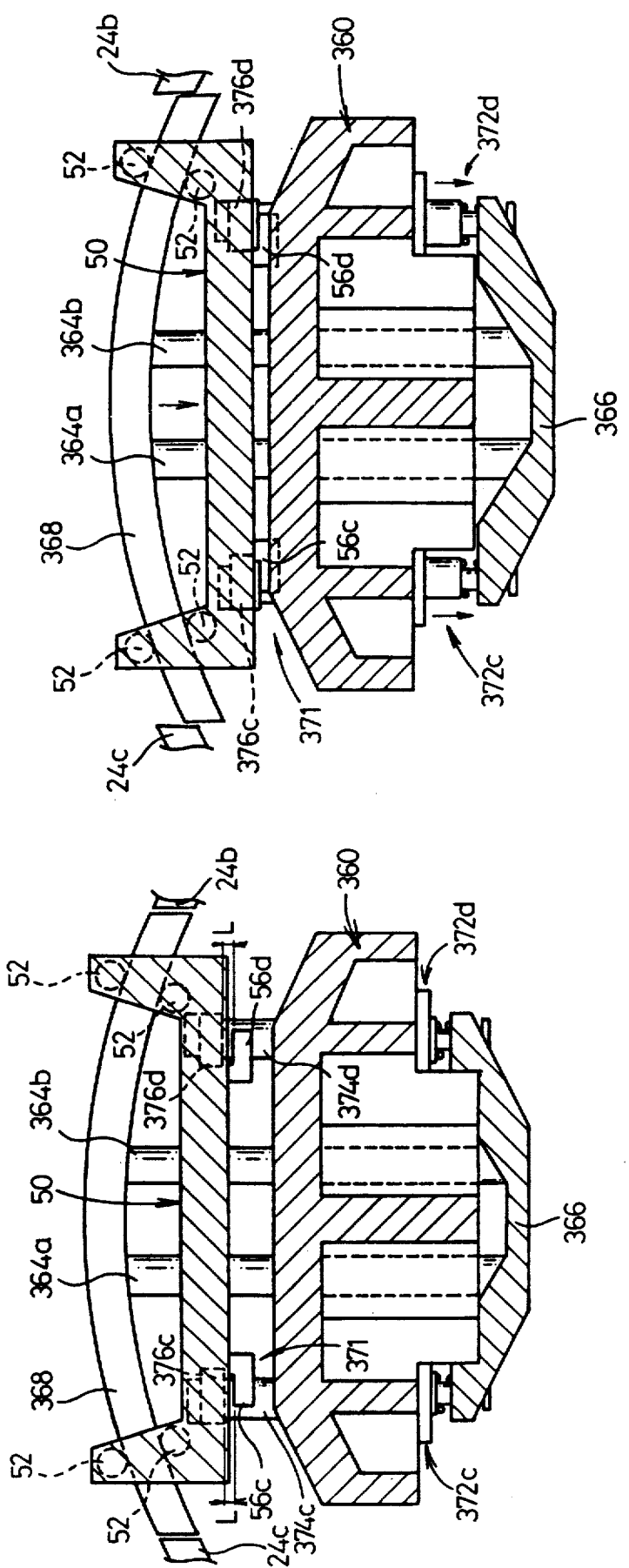

ROTARY TRANSFER SYSTEM

BACKGROUND OF THE INVENTION

1. Field of the Invention

The present invention relates to a rotary transfer system, and more particularly to a rotary transfer system for automatically changing the attitude of a workpiece-supporting pallet between horizontal and vertical directions, for example, and for feeding a workpiece supported on the pallet along an annular feed path while the workpiece is machined successively by radially arranged machine tools.

2. Description of Background Art

There is known a line production process in which a workpiece fed along a machining line is machined successively by different machine tools that are disposed along the machining line. A workpiece such as an engine cylinder head, for example, is required to be machined in many different steps. A machining line for producing such a workpiece requires machine tools to be spaced apart so that they will not interfere with each other during operation. Therefore, the overall production line including the machining line is considerably long, with the results that it is difficult effectively to utilize the space in the production factory, and the line production process is not efficient. Workpieces are fed along the machining line while they are mounted respectively on pallets. Therefore, as many pallets are used as the number of workpieces to be machined. If many workpieces of different types are to be machined, then it is necessary to provide as many pallets designed specifically to meet the configurations and dimensions of these workpieces. Use of such pallets is however not economical. After a workpiece has completely been machined, the pallet from which the workpiece is removed is moved back to a position where a new workpiece is to be set on the pallet. Therefore, a return conveyor or the like must be provided to return the pallet to the loading area.

Japanese Utility Model Publication No. 53-42847 discloses a rotary index system including a rotatable index table on which a plurality of rotatable jigs are mounted at certain angular intervals. With workpieces clamped respectively on the jigs, the index table is rotated in angular increments, and at the same time the jigs are rotated through desired angles.

If the rotary index system is incorporated in a production line, it is necessary that workpieces delivered along the production line be changed in attitude and paced on the respective jigs, and, after the workpieces have been machined, they be changed in attitude again and transferred back onto the production line.

More specifically, the workpieces are held in a horizontal attitude while they are being conveyed along the production line, but the workpieces have to be held in a vertical attitude while they are being machined. Accordingly, it is necessary to change the attitude of workpieces between horizontal and vertical directions between the production line and the rotary index system. It is considerably tedious and time-consuming for the operator to change the workpiece attitude manually.

Various devices have been proposed to change the workpiece attitude automatically. One such device is disclosed in Japanese Laid-Open Patent Publication No. 50-26177, for example. The disclosed device includes a loading device for change shifting a workpiece between horizontal and vertical attitudes by rolling the workpiece 90° over in a vertical plane, and also for delivering the workpiece in the vertical attitude to a machine tool.

After the workpiece has been rolled over by 90°, it is delivered from the loading device to one of various machine tools. In practice, it takes a long time to load the workpiece onto the machine tool. Therefore, it has been difficult to machine the workpiece efficiently.

When the index table of the rotary index system disclosed in Japanese Laid-Open utility model Publication No. 53-42847 rotates, the jigs are rotated to respective angular positions by gears meshing with a gear mounted on the index table. The index table should therefore be rotated in highly accurate angular increments or steps. If the index table was rotated through incorrect angles, the angular positions of all the jigs would become improper, and the workpieces set on the respective jigs would not be machined as desired. It is however not easy to angularly position the index table highly accurately. Difficulty has been experienced in incorporating the rotary index system in a rotary transfer system which positions a workpiece successively with respect to a plurality of radially arranged machine tools.

Another proposed rotary index system includes a single main gear mounted coaxially on a rotatable index table and rotatable independently of the rotatable index table, and a plurality of jigs mounted on the index table at angular intervals and having respective subgears meshing with the main gear (see Japanese Laid-Open Patent Publication No. 54-82782).

With this rotary index system, workpieces supported on the respective jigs are positioned with respect to respective machine tools when the single main gear is rotated to rotate the subgears which rotate the jigs. Controlling the rotation of the main gear to position the workpieces is however quite a complex process. In real operation, different areas of the workpieces are machined by the machine tools. Consequently, it is almost impossible to index the workpieces to respective exact angular positions with respect to the respective workpieces.

When a workpiece is to be machined by a machine tool, the workpiece must be securely positioned with respect to the workpiece. Japanese Laid-Open Utility Model Publication No. 59-78042 discloses an arrangement for indexing a workpiece with respect to a machine tool. More specifically, a pallet supporting a workpiece is delivered along a straight guide rail successively through machining stations. After the guide rail and the pallet have been pulled in unison toward a jig by means of a clamp, the jig is rotated through a certain angle to index the workpiece to a desired angular position with respect to a machine tool.

This indexing system, however, cannot easily be combined with a rotary transfer system because of the difference between the straight feed path of the indexing system and the annular feed path of the rotary transfer system. More specifically, the straight guide rail for delivering the pallet is integrally joined to the clamp. If the clamp was positioned on an arcuate guide rail of the annular feed path, then the pallet traveling along the arcuate guide rail would interfere with the clamp. It would not be possible to combine the clamp directly with the rotary transfer system If the clamp is to be somehow put in the rotary transfer system, then a special mechanism is needed to avoid physical interference between the pallet and the clamp. The resulting mechanism would however be complex and expensive. A feed device for feeding the pallet linearly cannot be used as an annular feed device on the rotary transfer system.

SUMMARY OF THE INVENTION

It is a primary object of the present invention to provide a rotary transfer system for automatically converting the attitude of a workpiece fed along a line quickly into a desired attitude, machining the workpiece highly accurately at successive machining stations, and then delivering the machined workpiece back to the line, the rotary transfer system being small in size and capable of machining the workpiece efficiently.

Another object of the present invention is to provide a rotary transfer system comprising an attitude converting station for automatically changing the attitude of a pallet with a workpiece supported thereon into a predetermined attitude, at least two machining stations for machining said workpiece, and feeder means for feeding said pallet along an arcuate feed path from said attitude converting station successively to said machining stations.

Still another object of the present invention is to provide the rotary transfer system wherein said annular feed path has a pair of upper and lower arcuate movable rails disposed in each of said attitude converting station and said machining stations, and a pair of upper and lower arcuate fixed rails aligned with said movable rails.

Yet another object of the present invention is to provide the rotary transfer system wherein each of said machining stations has a rotatable pallet index jig body, said movable rails being disposed on said pallet index jig body, said movable rails being movable toward and away from the center of said annular feed path for positioning said movable rails out of interference with said fixed rails when said pallet index jig body is rotated.

Yet still another object of the present invention is to provide the rotary transfer system wherein said feeder means has a plurality of arms rotatable by a rotative drive source, said arms having vertically movable engaging members for engaging said pallet to feed the pallet along said annular feed path when said rotative drive source is operated.

A further object of the present invention is to provide a rotary transfer system comprising an attitude converter for changing the attitude of a workpiece which has been fed in a horizontal attitude along a first feed path to a vertical attitude and for delivering the workpiece in the vertical attitude onto an annular second feed path, said attitude converter including a rotary table rotatably disposed between said first and second feed paths, a pallet holder supported on said rotary table at an end portion thereof spaced from the center of rotation of the rotary table, and an actuator for vertically swinging said pallet holder, the arrangement being such that after the pallet holder is turned into a horizontal position and the workpiece that has been fed along said first feed path is supported on a pallet on said pallet holder, said pallet holder is turned into a vertical attitude by said actuator, then said rotary table is rotated through a predetermined angle, and thereafter said pallet with the workpiece thereon is delivered onto said second feed path.

A still further object of the present invention is to provide the rotary transfer system with rails mounted on said rotary table and serving as one of said feed paths, said rails being vertically movable by an actuator.

A yet further object of the present invention is to provide the rotary transfer system with clamp means for holding the pallet on said pallet holder, said clamp means comprising at least one rod axially movable back and forth by an actuator, said rod having a guide groove defined therein, and an engaging member coupled to said rod and having a pin extending through said guide groove, the arrangement being such that when said rod is axially moved by said last-mentioned actuator, said engaging member is angularly displaced while being guided by said guide groove and said pin, for pressing said pallet against said pallet holder.

A yet still further object of the present invention is to provide the rotary transfer system wherein said last-mentioned actuator comprises a cylinder having a piston rod, said clamp means comprising a movable plate coupled to said piston rod, a pair of rods slidably fitted in opposite sides of said pallet holder and coupled to said movable plate at least one positioning pin for fitting engagement in a positioning hole in said pallet, and a pair of engaging members coupled to said rods, respectively, the arrangement being such that when said movable plate is displaced in one direction by said cylinder, said engaging members are pressed by said rods against opposite sides of said pallet and said positioning pin is fitted in said positioning hole, thereby positioning said pallet.

Another object of the present invention is to provide a rotary transfer system comprising a pallet holder/releaser for changing the attitude of a pallet with a workpiece supported thereon from a horizontal attitude to a vertical attitude and automatically placing said pallet on and removing said pallet from an annular feed path, said pallet holder/releaser having vertically movable upper and lower rails serving as a portion of said annular feed path, said upper rail having slots for passage therethrough of rollers supported on said pallet, and rotors disposed on said upper rail for selectively opening and closing said slots, said rotors having upper surfaces lying flush with the upper surface of said upper rail to provide a continuous path for said rollers to roll thereon.

Still another object of the present invention is to provide the rotary transfer system wherein said upper rail has at least two recesses defined therein and slots communicating with said recesses for passage therethrough of said rollers, said rotors being fitted respectively in said recesses and having slots which can register with said slots in said upper rail, further including a single actuator for rotating said rotors through a link mechanism.

Still another object of the present invention is to provide the rotary transfer system wherein said upper surfaces and opposite side surfaces of said rotors lie flush with the upper surface and opposite side surfaces of said upper rail when said slots in said upper rail are closed by said rotors.

Yet another object of the present invention is to provide the rotary transfer system further including a bracket vertically movable by a cylinder, said upper rail being mounted on said bracket, said bracket having a holder member, and feeder means for engaging said pallet to feed the pallet along said annular feed path said holder member engaging said feed means, the arrangement being such that when said upper rail is moved upwardly by said cylinder, said feeder means is moved upwardly through said holder member so as to be released from said pallet.

Yet still another object of the present invention is to provide a rotary transfer system comprising an index device for indexing a pallet supporting a workpiece and fed along an annular feed path, with respect to a machine too, said index device having a jig body rotatable by an actuator, and guide rods axially movably mounted on said jig body and supporting a rail constituting said annular feed path, and clamp means for pulling said pallet together with said rail toward said jig body.

A further object of the present invention is to provide the rotary transfer system wherein said clamp means has a plurality of cylinders having first and second pistons rods, finger members mounted on said first piston rods for engaging said pallet, and a joint member to which said second rods and said guide rod are coupled.

A yet further object of the present invention is to provide the rotary transfer system wherein said clamp means includes resilient members acting between said second piston rods and said joint member for normally urging said joint member away from said pallet.

A still further object of the present invention is to provide the rotary transfer system wherein said index device further includes a support table, an index table rotatably mounted on said support table, said jig body being vertically disposed on said index table, a first coupling disposed on one of said support and index tables, and second and third couplings disposed on the other of said support and index tables and engageable with said first coupling for angularly positioning said index table with respect to said support table.

A yet still further object of the present invention is to provide the rotary transfer system wherein said index device further includes fixing means for fixing said index table with respect to said support table.

Still another object of the present invention is to provide the rotary transfer system wherein said fixing means comprises an arm swingable by an actuator, and a clamp having a partly spherical surface fitted in an end of said arm and a flat pressing surface for pressing said index table against said support table when said arm is swung by said actuator.

Still another object of the present invention is to provide the rotary transfer system further including a rotary joint supporting an upper portion of said jig body, said jig body having a cylinder disposed therein, said rotary joint having means for supplying a working medium to said cylinder in said jig body.

Yet another object of the present invention is to provide a rotary transfer system comprising a jig body independent with respect to a machine tool, a clamp device for holding a pallet supporting a workpiece and fed along an annular feed path, on said jig body, said clamp device having at least one finger disposed on said jig body and movable back and forth by an actuator, and at least one engaging member disposed on said pallet and engageable by said finger for pulling said pallet toward said jig body, said finger and said engaging member being spaced a distance from each other so that when said pallet moves along said annular feed path, said engaging member and said finger are held out of interference with each other.

The above and other objects, features and advantages of the present invention will become more apparent from the following description when taken in conjunction with the accompanying drawings in which a preferred embodiment of the present invention is shown by way of illustrative example.

BRIEF DESCRIPTION OF THE DRAWINGS

FIGS. 9(a) and 9(b) are perspective views showing the manner in which a clamp of the attitude converter operates

FIGS. 13(a) and 13(b) are cross-sectional views showing the manner in which the clamp device operates.

DETAILED DESCRIPTION OF THE PREFERRED EMBODIMENT

Figure 1:
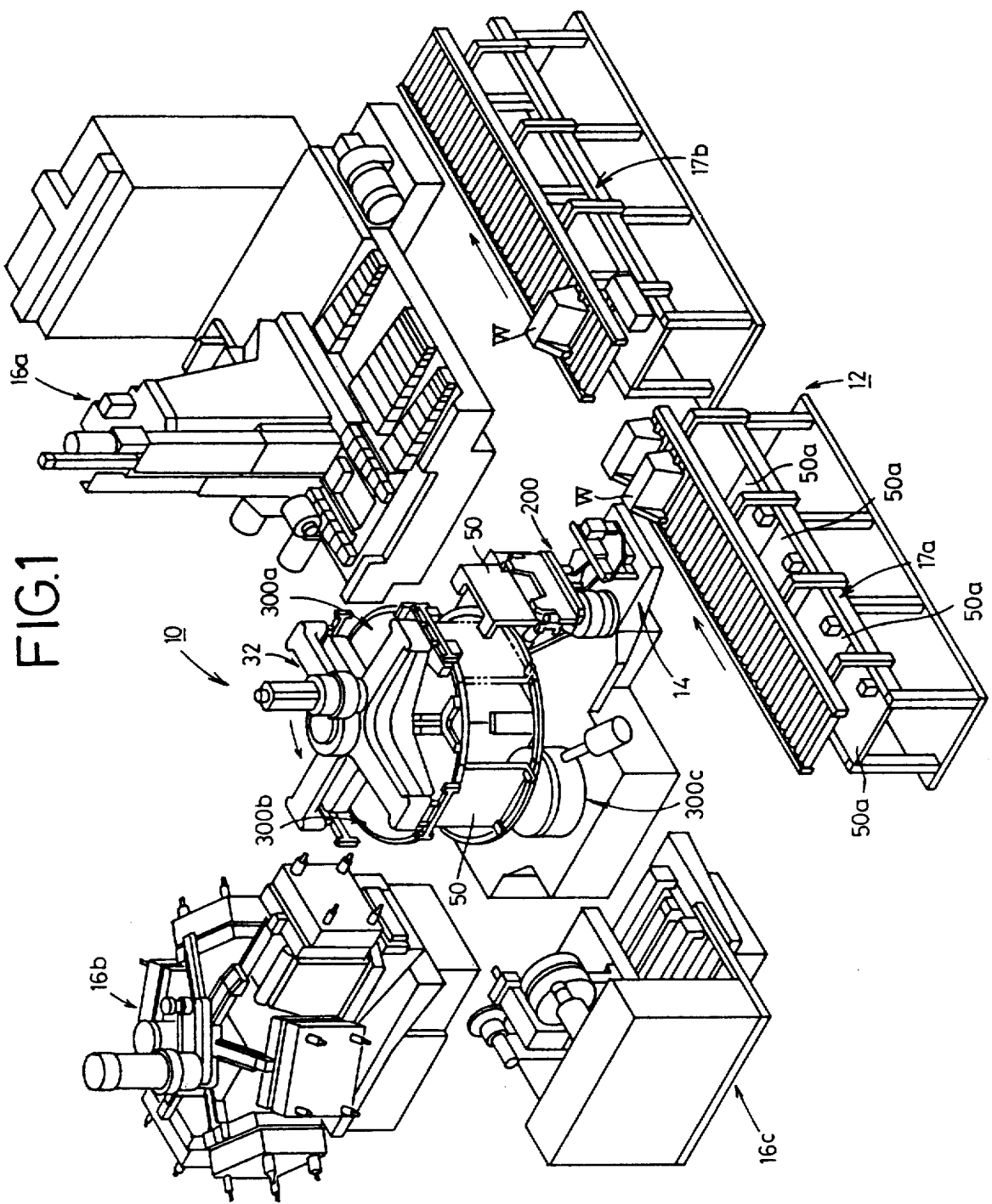
FIG. 1 is a perspective view of a rotary transfer system according to the present invention, machining devices or machine tools, and a production line.

FIGS. 1 through 4 illustrate a rotary transfer system, generally designated by the reference numeral 10, according to the present invention. The rotary transfer system 10 is incorporated in a production line 12. Each workpiece W which is fed along the production line 12 as indicated by the arrow is placed on a pallet 50 and converted into a desired attitude in a attitude converting station 14, then delivered through predetermined angular intervals along an annular feed path and machined successively by machining devices or machine tools 16a through 16c which are arranged radially outwardly of the rotary transfer system 10, converted back into the original attitude and fed back to the production line 12, and thereafter delivered along the production line 12 toward a next working position. Pallet stockers 17a, 17b are disposed below the production line 12. Four pallets 50a designed for workpieces W of different types are stored in the pallet stocker 17a.

The rotary transfer system 10, the production line 12, and the machining devices 16a through 16c are schematically shown in FIG. 1. Actually, the production line 12 and the machining devices 16a through 16c are closer to the rotary transfer system 10 than illustrated. The machining devices 16a through 16c are of known nature and will not be described in detail.

The rotary transfer system 10 includes a foundation base 18 with a prismatic column 20 centrally mounted thereon. Lower support members 22a through 22d which are of a bent shape and project outwardly have ends fixed to the lower end corners of the column 20. The other ends of the lower support members 22a through 22d support arcuate lower fixed rails 24a through 24d, respectively, which extend circularly around the column 20. Upper support members 26a through 26d are fixed to the upper end corners of the column 20. The upper support members 26a through 26d support arcuate upper fixed rails 28a through 28d, respectively, which are positioned upwardly of the lower support members 26a through 26d and extend circularly around the column 20. The lower fixed rails 24a through 24d, displaceable lower rails (described later on), and the upper fixed rails 28a through 28d, and displaceable upper rails (described later on) jointly provide an annular feed path 29 (see FIG. 3).

Fixed arms 30a through 30d which are 90° spaced apart and project radially outwardly between the upper support members 26a through 26d are fixed to an upper portion of the column 20. To the fixed arms 30a through 30d, there are fixed components of a pallet holder/releaser and an index device which will be described later on.

A feeder 32 is mounted on the upper end of the column 20 and has a rotor 34 rotatably mounted on the upper end of the column 20. Movable arms 36a through 36d that are 90° spaced apart are integrally joined to the rotor 34 and project radially outwardly. A rotative drive source 37 is vertically disposed at the boundary between the movable ar 36a and the rotor 34. Intermeshing gears are coupled respectively to the rotative drive source 37 and the rotor 34. The movable arm 36a projects radially outwardly beyond the upper fixed rails 28a through 28d, and a pair of vertical guide bars 38a, 38b is vertically movably supported on the outer end of the movable arm 36a. A horizontal rod 40 is supported on the lower ends of the guide bars 38a, 38b, and engaging members 42a, 42b which are horizontally spaced from each other by a distance corresponding to the width of a pallet 50 (described later) are secured to the opposite ends of the rod 40. The other movable arms 36b through 36d are similar in structure to the movable arm 36a. Those parts of the movable arms 36b through 36d which are identical to those of the movable arm 36a are denoted by identical reference characters, and will not be described in detail.

A pallet holder/releaser 100 is mounted on the fixed arm 30a which is directed toward the production line 12.

Figure 4:
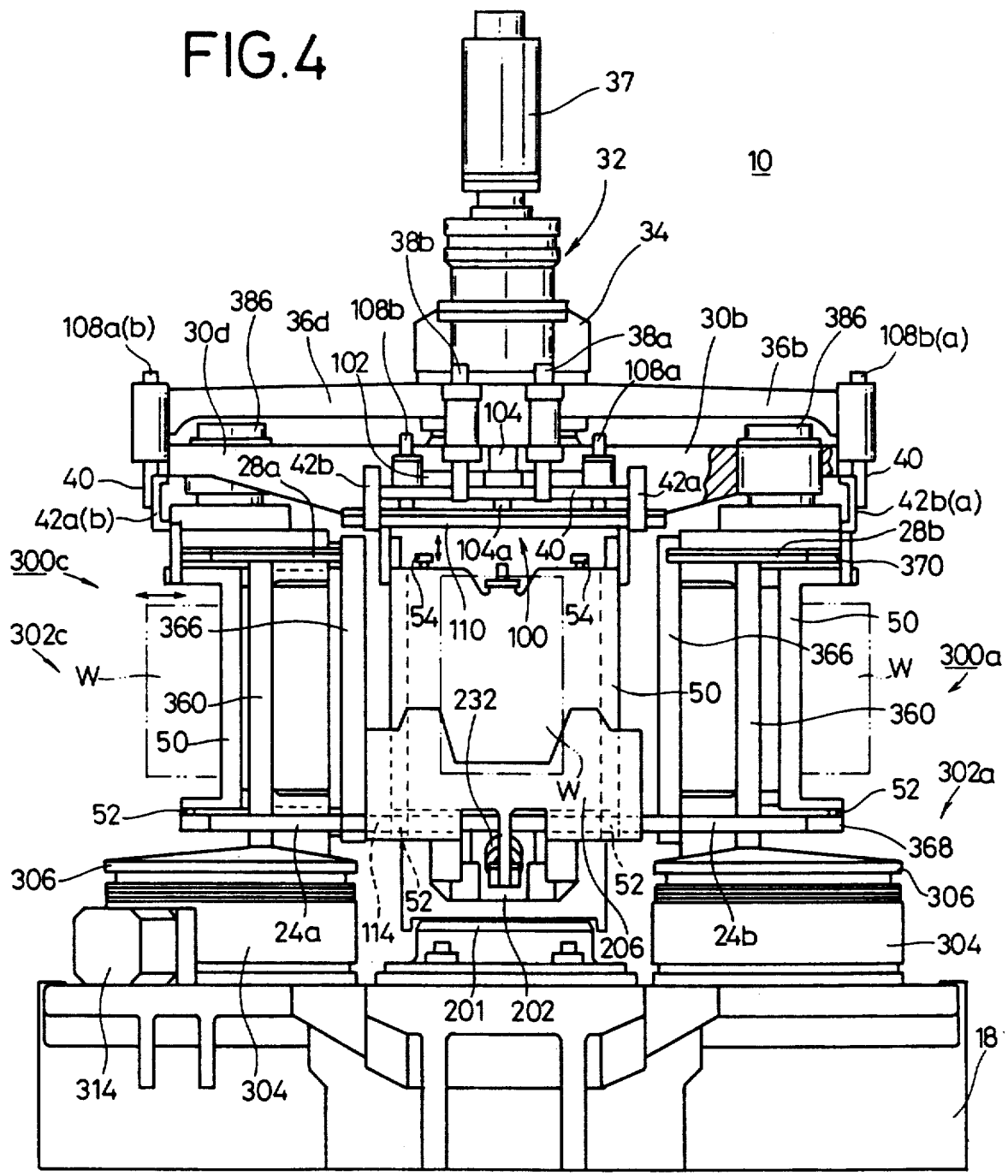
FIG. 4 is a side elevational view, partly cut away, of the rotary transfer system.
Figure 5:
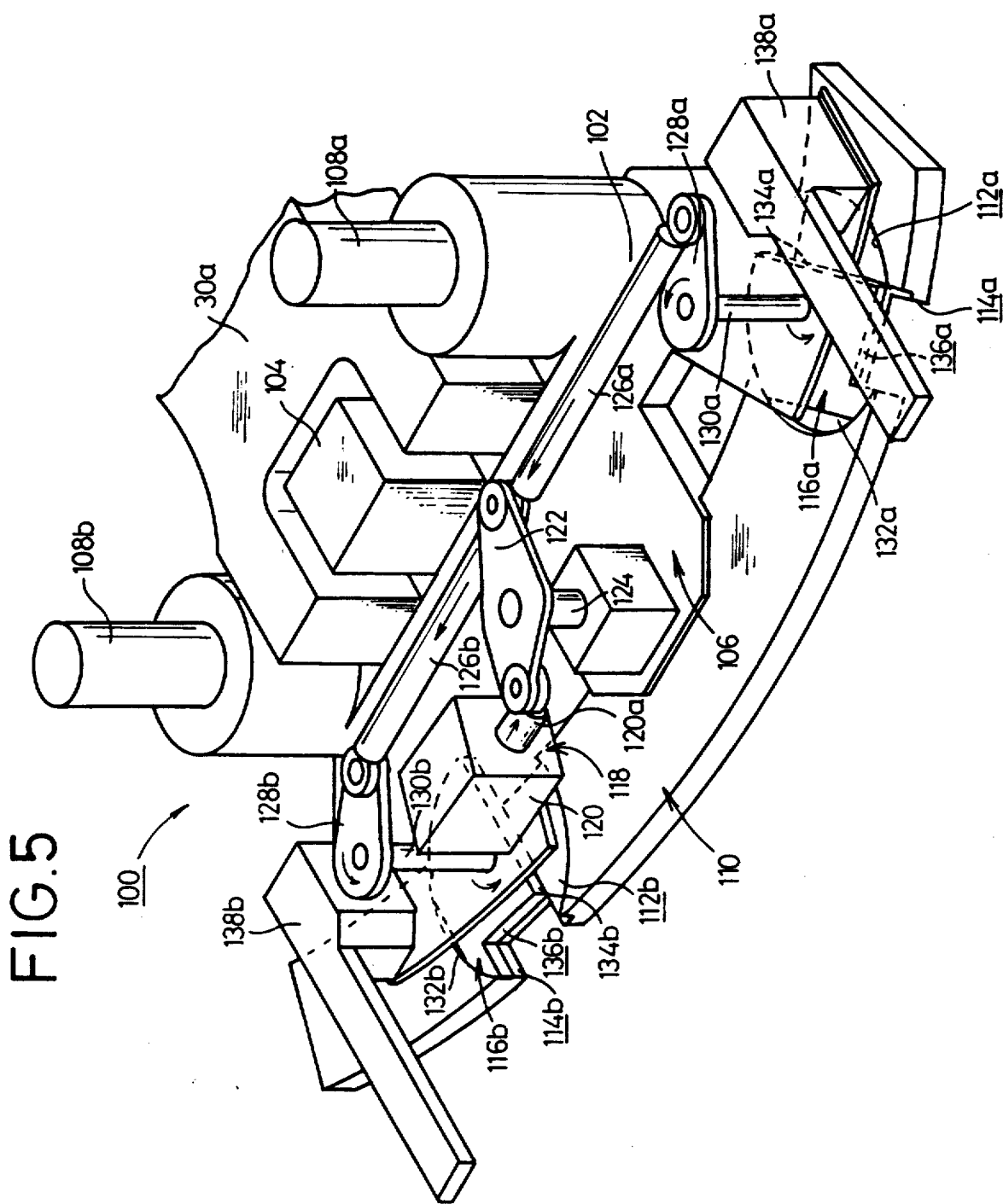
FIG. 5 is an enlarged fragmentary perspective view of a pallet holder/releaser of the rotary transfer system.
Figure 6:
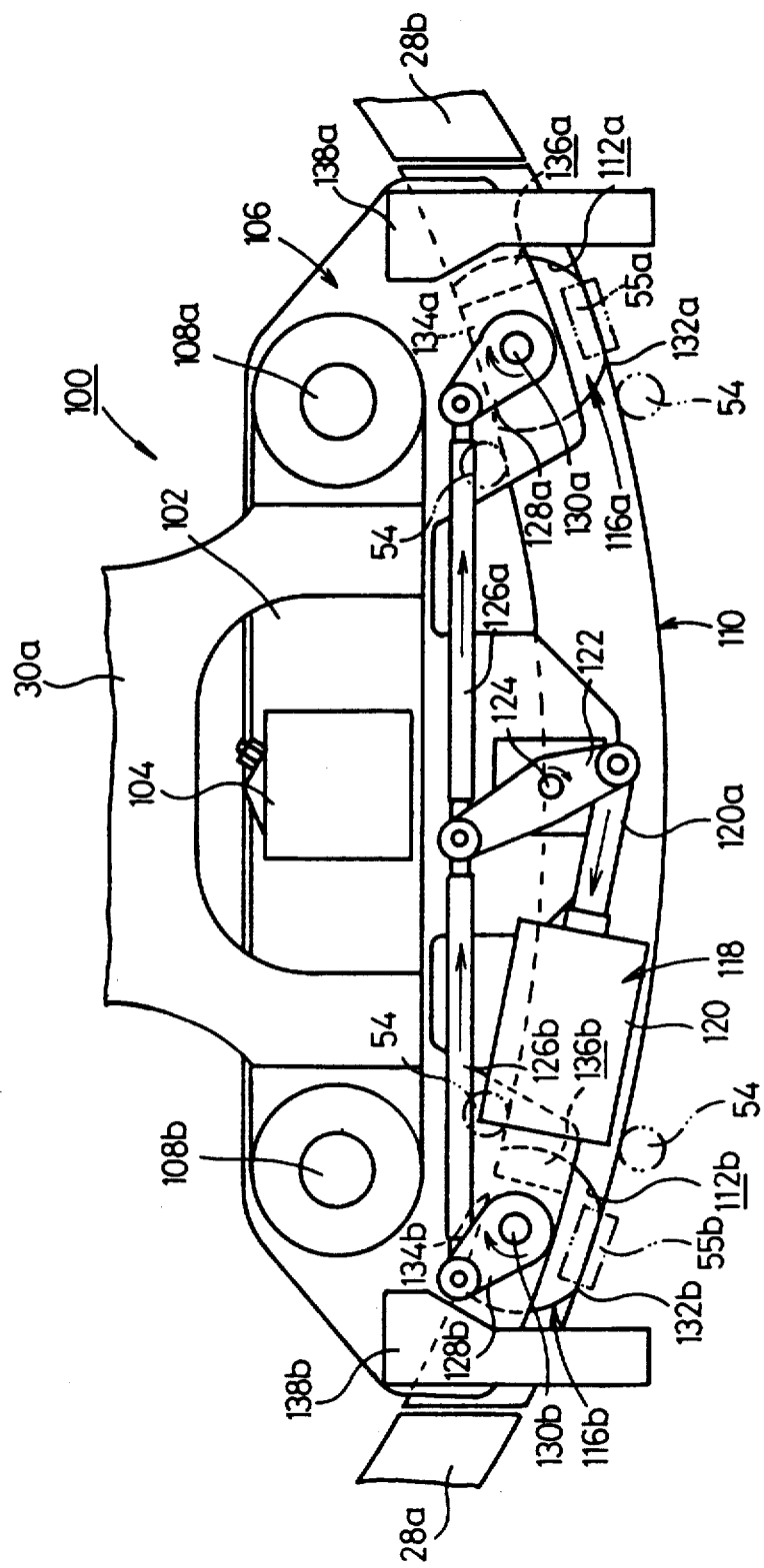
FIG. 6 is a plan view of the pallet holder/releaser.

As shown in FIGS. 4 through 6, a support member 102 is fixed to the end of the fixed arm 30a, and a cylinder 104 is placed substantially centrally on the support member 102. The cylinder 104 has a downwardly extending piston rod 104a to which a bracket 106 is affixed. As shown in FIG. 5, guide bars 108a, 108b are vertically mounted on the bracket 106 and fitted in the opposite ends of the support member 102. An arcuate upper rail 110 which can be positioned in circumferential alignment with the upper fixed rails 28a, 28b is fixed to the bracket 106.

The upper rail 110 has first and second recesses 112a, 112b defined in its upper surface and corresponding in position to rollers (described later on) on pallets 50. The recesses 112a, 112b have edges which are part of imaginary circles each having a diameter larger than the radial width of the upper rail 110. Each of the recesses 112a, 112b has a depth which is about ½ of the thickness of the upper rail 110. The upper rail 110 also has first and second rectangular slots 114a, 114b defined in its outer edge and communicating with the first and second recesses 112a, 112b, respectively. First and second rotors 116a, 116b are disposed respectively in the first and second recesses 112a, 112b, and are rotatable in unison with each other through a certain angle by an actuator 118.

The actuator 118 includes a cylinder 120 fixedly mounted on the bracket 106 and having a piston rod 120a coupled to one end of a link 122. The link 122 is rotatably supported at its substantially central portion on the bracket 106 by means of a pin 124. The other end of the link 122 is connected to ends of first and second link bars 126a, 126b which extend substantially coaxially with each other. The other ends of the first and second link bars 126a, 126b are operatively coupled to first and second rotatable shafts 130a, 130b, respectively, which extend through the bracket 106 and are joined coaxially to the first and second rotors 116a, 116b, respectively.

The first rotor 116a is rotatably fitted in the first recess 112a and has its upper surface lying flush with the upper surface of the upper surface 110. The peripheral edge of the first rotor 116a has a first arcuate surface 132a aligned with the outer peripheral edge of the upper rail 110. The peripheral edge of the first rotor 116a also has a second arcuate surface 134a opposite to the first arcuate surface 132a and aligned with the inner peripheral edge of the upper rail 110. The first rotor 116a has a slot 136a defined in its peripheral edge and angularly displaced from the first and second slots 132a, 134a, the slot 136a being aligned with the first slot 114a.

The second rotor 116b is identical in structure to the first rotor 116a. Those parts of the second rotor 116b which are identical to those of the first rotor 116a are denoted by identical reference numerals with a suffix b, and will not be described in detail.

Holding members 138a, 138b spaced from each other by a certain interval are fixedly mounted on the bracket 106. The holding members 138a, 138b engage the engaging members 42a, 42b, respectively, of the feeder 32 and vertically move the engaging members 42a, 42b.

A lower rail 142 which is vertically movable by cylinders 140a, 140b (FIG. 7) is provided in an attitude converter 200 below the upper rail 110.

Figure 2:
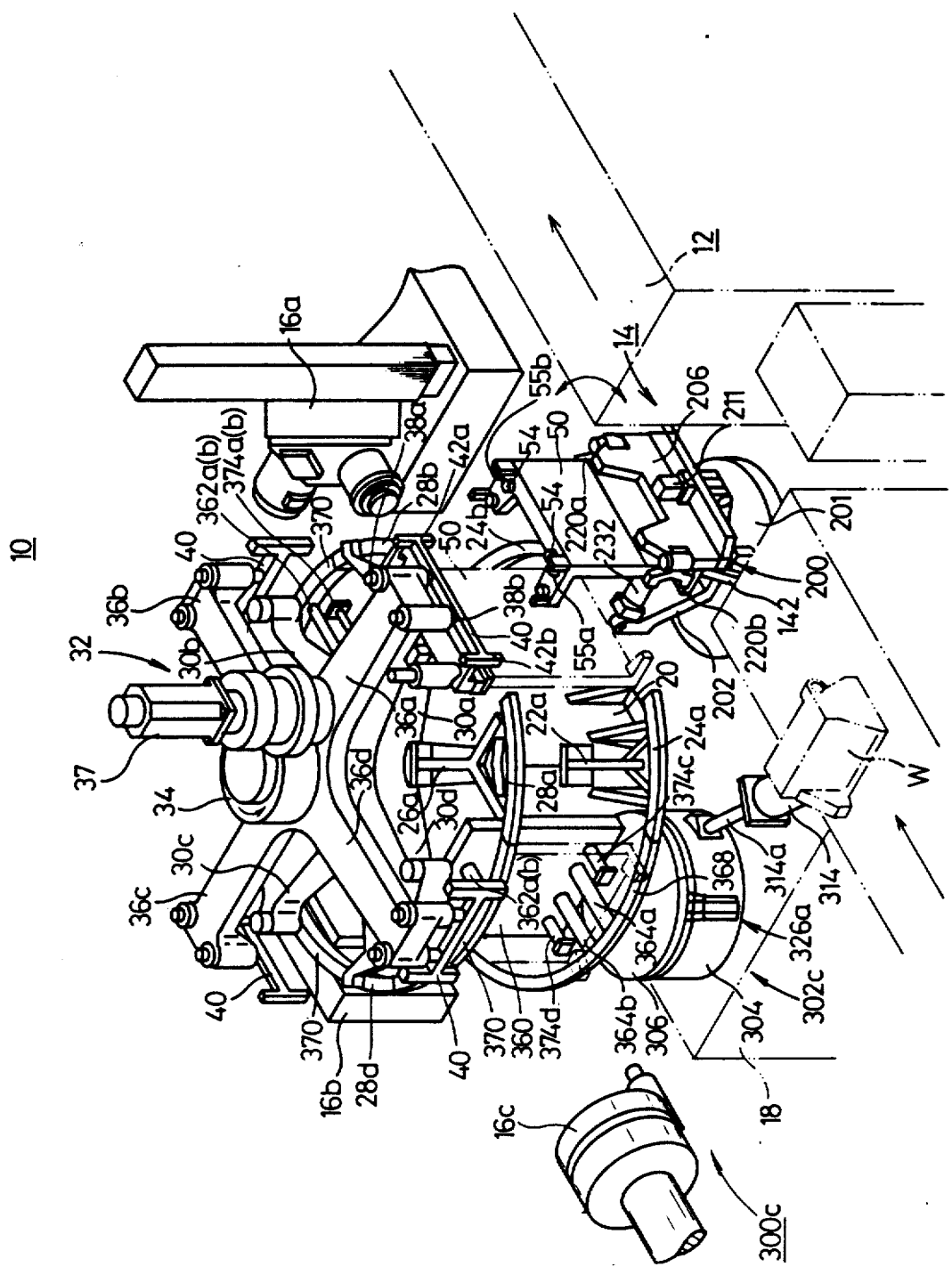
FIG. 2 is a perspective view of the rotary transfer system.
Figure 3:
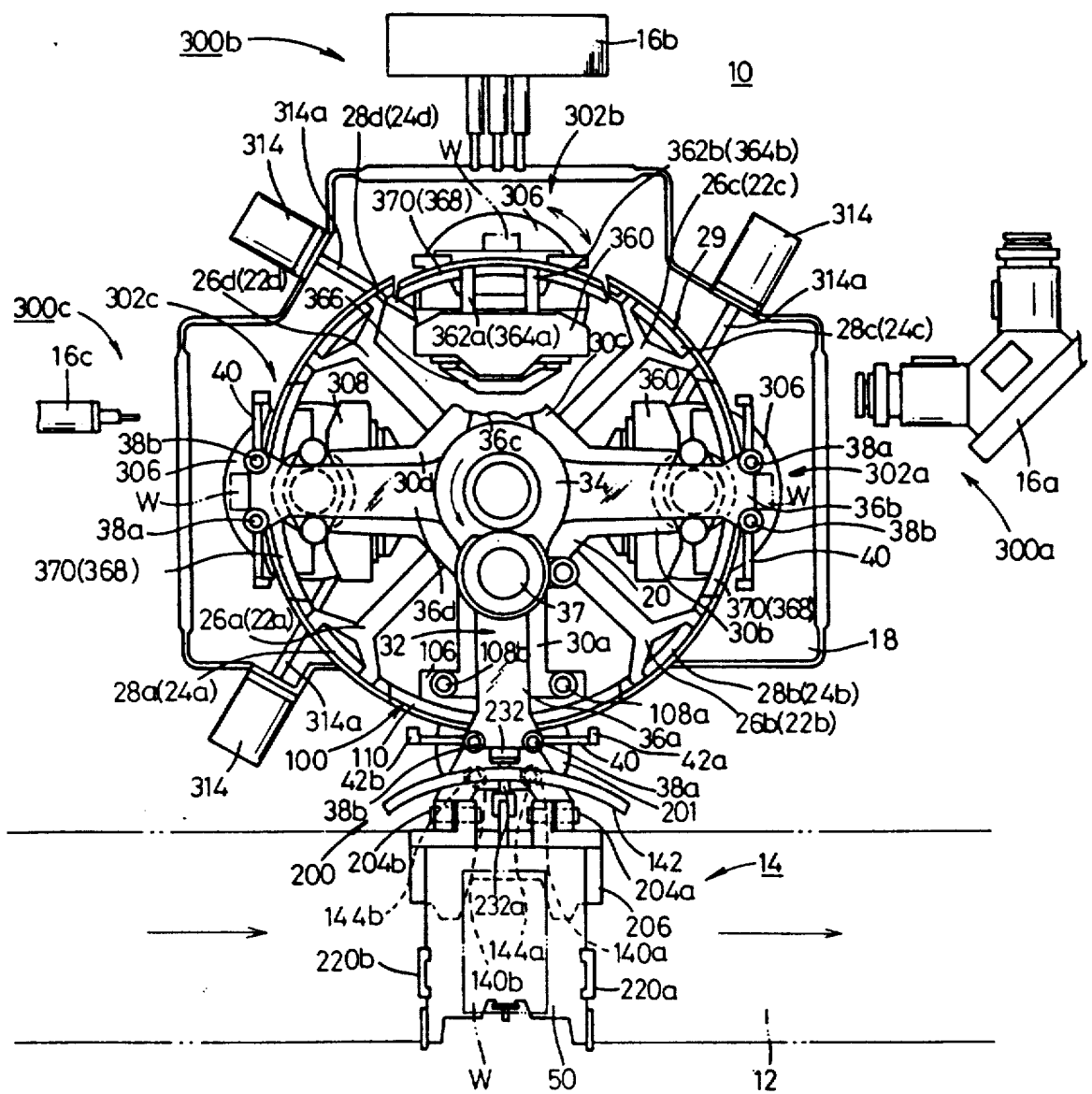
FIG. 3 is a plan view of the rotary transfer system.
Figure 7:
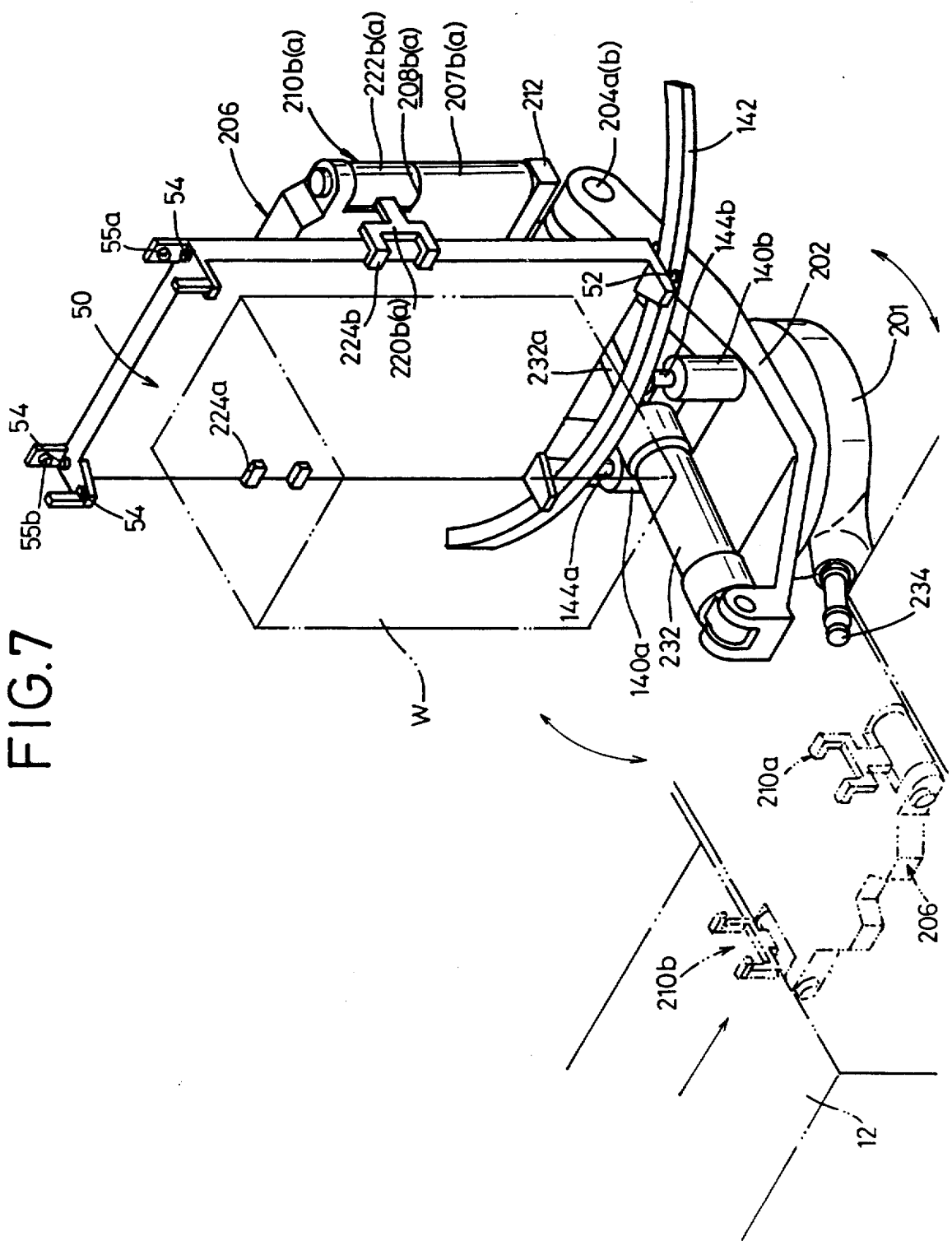
FIG. 7 is a perspective view of an attitude converter of the rotary transfer system.
Figure 8:
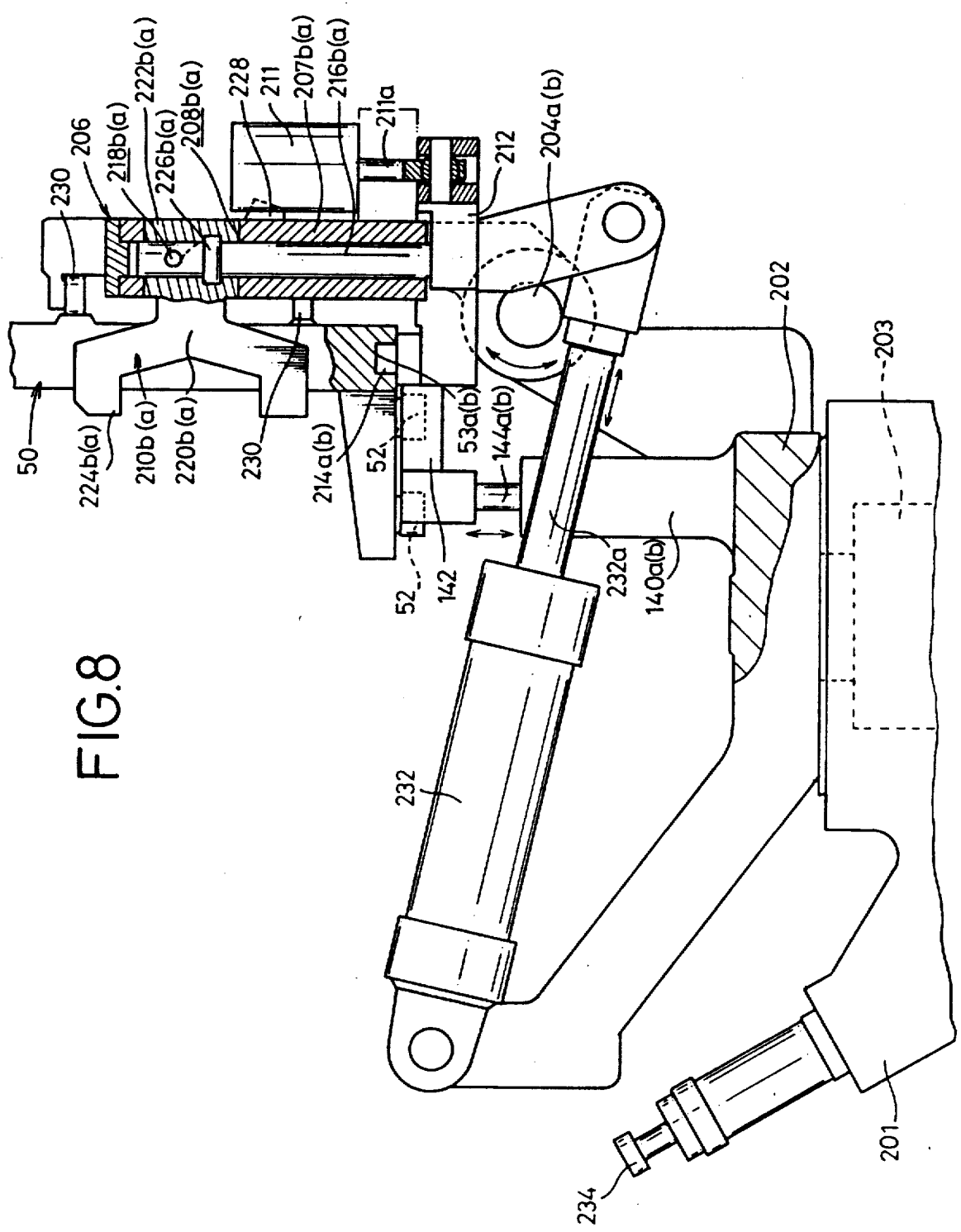
FIG. 8 is a side elevational view, partly in cross section, of the attitude converter.

The attitude converter 200 serves to convert the attitude of a workpiece W fed along the production line 12 as indicated by the arrow into a desired attitude, delivers the workpiece W onto the annular feed path 29, and, after the workpiece W has been machined by the machining devices 16a through 16c, convert the attitude of the workpiece W again, and deliver the workpiece W back to the production line 12. As shown in FIGS. 2, 7, and 8, the attitude converter 200 includes a mount table 201 disposed between the foundation table 18 and the production line 12, and a rotary table 202 rotatably mounted on the mount table 210 and rotatable by a rotative drive source 203 (FIG. 8). The cylinders 140a, 140b are mounted on the rotary table 202 in positions spaced from the center of rotation of the rotary table 202. The cylinders 140a, 140b have respective piston rods 144a, 144b on which the lower rail 142 is supported.

As illustrated in FIGS. 7 and 8, the rotary table 202 has opposite ends inclined obliquely upwardly in the radial direction. A pallet holder 206 is vertically swingably mounted on one of the ends of the rotary table 202 by means of support pins 204a, 204b. The pallet holder 206 is in the form of a plate including cylindrical portions 207a, 207b on its opposite sides. The cylindrical portions 207a, 207b have recesses 208a, 208b defined respectively therein, and clamps 210a, 210b for clamping a pallet 50 are disposed respectively in the cylindrical portions 207a, 207b.

More specifically, a cylinder 211 is fixed to one side of the pallet holder 206 opposite to the other side where the pallet 50 is to be held. The cylinder 211 has a piston rod 211a to which a movable plate 212 is fixed. The movable plate 212 extends in a direction normal to the piston rod 211a to the opposite longitudinal ends of the pallet holder 206. The movable plate 212 extends from below one side of the pallet holder 206 to a position below the other side thereof. Positioning pins 214a, 214b spaced from each other are mounted on the end of the movable plate 212 below the other side of the pallet holder 206.

The clamps 210a, 210b have respective guide rods 216a, 216b which have ends joined to the longitudinal opposite ends of the movable plate 212. The guide rods 216a, 216b have curved guide grooves 218a, 218b defined respectively therein. As shown in FIGS. 9(a) and (b), the guide groove 218a extend diametrically through the guide rod 216a and is circumferentially inclined along the axis of the guide rod 216a. The opposite ends of the guide groove 218a are axially spaced from each other and angularly displaced about 90° from each other. The guide groove 218b in the guide rod 216b is similar in shape to the guide groove 218a, but they are symmetric in shape.

The guide rods 216a, 216b are slidably fitted in the cylindrical portions 207a, 207b, respectively, of the pallet holder 206, and also in engaging members 220a, 220b disposed respectively in the recesses 208a, 208b in the cylindrical portions 207a, 207b. The engaging members 220a, 220b have cylindrical rotatable portions 222a, 222b in which the guide rods 216a, 216b are fitted, and clamp portions 224a, 224b projecting outwardly and having distal ends bent at about 90°. Pins 226a, 226b are fitted in the rotatable portions 222a, 222b and the guide grooves 218a, 218b in the guide rods 216a, 216b.

An engaging body 228 having a slanted end surface is mounted on said one side of the pallet holder 206, and rollers 230 for guiding the pallet 50 are supported on the other side of the pallet holder 206.

A cylinder 232 is swingably supported on the other end of the rotary table 202 and has a piston rod 232a operatively coupled to one end of the pallet holder 206.

A stopper 234 which is inclined outwardly in the upward direction is mounted on the mount table 201. The stopper 234 is engageable with the engaging body 228 on the pallet holder 206 for angularly positioning the pallet holder 206 with respect to the horizontal direction.

Machining stations 300a through 300c are positioned on the foundation table 18 below the respective fixed arms 30b through 30d in radial alignment with the machining devices 16a through 16c. Index devices 302a through 302c are disposed respectively in the machining stations 300a through 300c.

Figure 10:
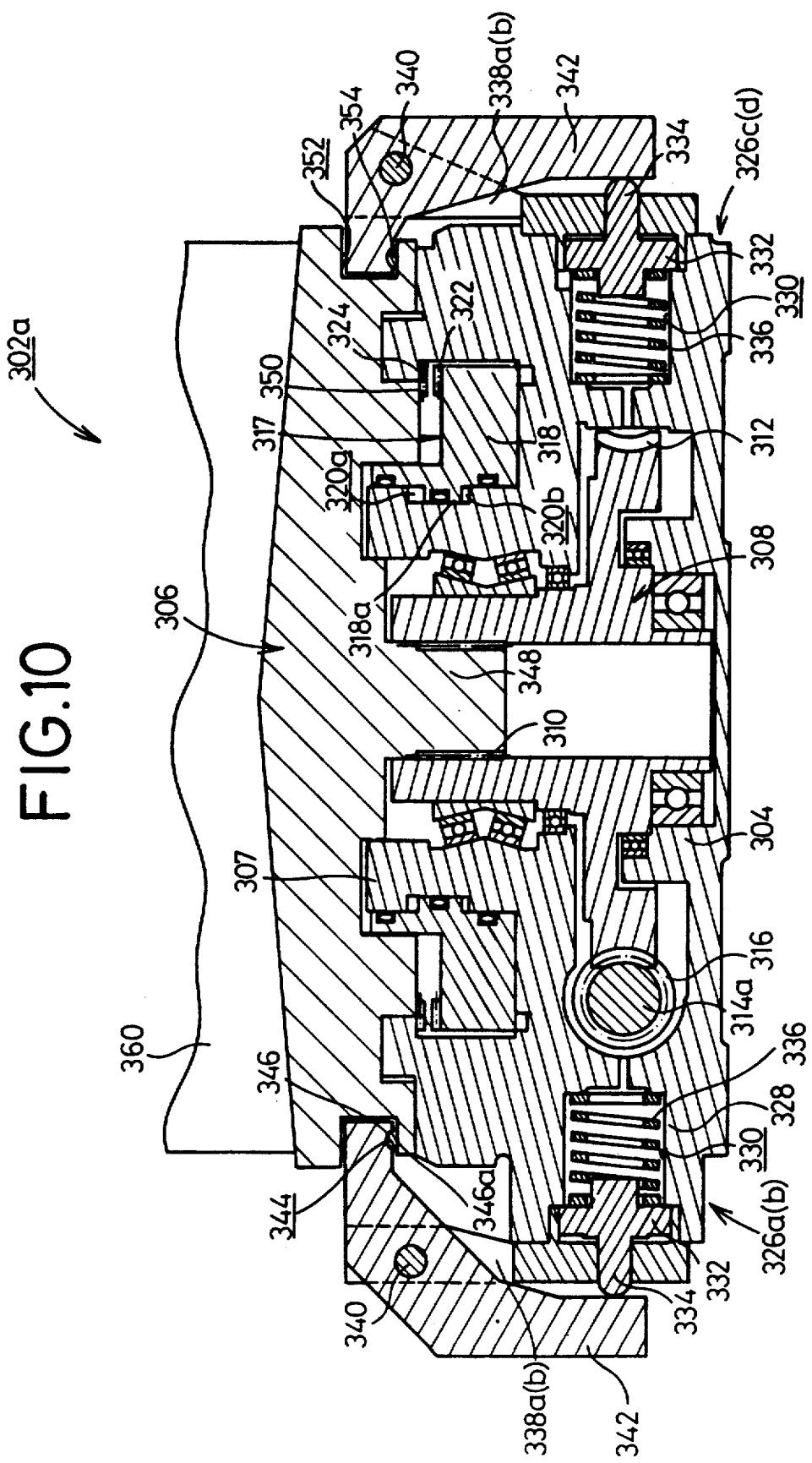
FIG. 10 is a vertical cross-sectional view of a support table and an index table of an index device of the rotary transfer system.

The index device 302a has a disc-shaped support table 304, and an index table 306 which is angularly movable in certain angular increments is disposed on the support table 304. As shown in FIG. 10, an upwardly extending ring 307 is disposed centrally on the support table 304, and a substantially cylindrical drive shaft 308 is rotatably supported in the ring 307. The drive shaft 308 has splines 310 of a given length on its upper inner peripheral surface. A worm wheel 312 which has a relatively large diameter is coaxially joined integrally to a lower portion of the drive shaft 308. A rotatable shaft 314a of a rotative drive source 314 (FIG. 2) mounted on the foundation base 18 extends into the support table 304. A worm 316 on the distal end of the drive shaft 314a is held in mesh with the worm wheel 312. When the rotative drive source 314 is energized, the drive shaft 308 is rotated thereby through the worm 316 and the worm wheel 312.

An indexing unit 317 is disposed around the ring 307 on the support table 304. The indexing unit 317 includes a piston 318 having a ridge 318a radially inwardly projecting from its inner peripheral surface and held in sliding contact with the ring 307. First and second pressure chambers 320a, 320b are defined between the ridge 318a and the ring 307. Oil under pressure can be introduced into and discharged from the first and second pressure chambers 320a, 320b.

A first coupling 322 is fixed to an upper outer peripheral edge of the piston 318 and has teeth each of a convex shape having a central wider portion. A second coupling 324 which is directed downwardly is mounted on the support table, and has a width which is about ½ of the radial width of the first coupling 324. The second coupling 324 has teeth disposed for mesh with the outer ends of the teeth of the first coupling 322.

Fixing units 326a through 326d which are 90° spaced apart are mounted in the outer periphery of the support table 304. The fixing units 326a through 326d are structurally identical to each other. Therefore, only the fixing unit 326a will be described below. Those parts of the other fixing units 326b through 326d which are identical to those of the fixing unit 326a are denoted by identical reference numerals, and will not be described in detail.

The fixing unit 326a has a cylinder 328 including a stepped hole 330 in which a piston 332 is slidably disposed. The piston 332 has a rod 334 extending out of the cylinder 328. A resilient member 336 such as a spring is disposed in the stepped hole 330 for normally urging the piston 332 in the radially outward direction of the support table 304. A pair of brackets 338a, 338b is mounted on the cylinder 328, and a clamp arm 342 is swingably supported on the brackets 338a, 338b by means of a pin 340. The clamp arm 342 has one end engaging the rod 334 extending from the piston 332, and has a semispherical cavity 344 defined in the lower surface of the other end thereof. A semispherical clamp 346 is fitted in the cavity 344 and has a lower flat pressing surface 346a projecting downwardly from the lower surface of the clamp arm 342. The index table 306 is pressed and held in position by the clamp arm 342 through the clamp 346.

A spline shaft 348 with its splines meshing with the splines 310 on the drive shaft 308 is disposed centrally on the index table 306. A third coupling 350 which is directed downwardly is mounted on a lower outer peripheral edge of the index table 306 and positioned radially inwardly of the second coupling 322 on the support table 304. The third coupling 350 has teeth disposed for mesh with the inner ends of the teeth of the first coupling 322. The piston 318, the first coupling 322 mounted on the piston 318, and the second and third couplings 324, 350 for mesh with the first coupling 322 jointly constitute the indexing unit 307.

The index table 306 has a peripheral groove 352 defined in the outer peripheral surface thereof. The upper ends of the clamp arms 342 of the fixing units 326a through 326d are disposed in the peripheral groove 352. At this time, the flat pressing surfaces 346a of the clamps 346 fitted in the cavities 344 defined in the upper ends of the clamp arms 342 are held in sliding contact with a bottom surface 354 by which the peripheral groove 352 is partly defined.

Figure 11:
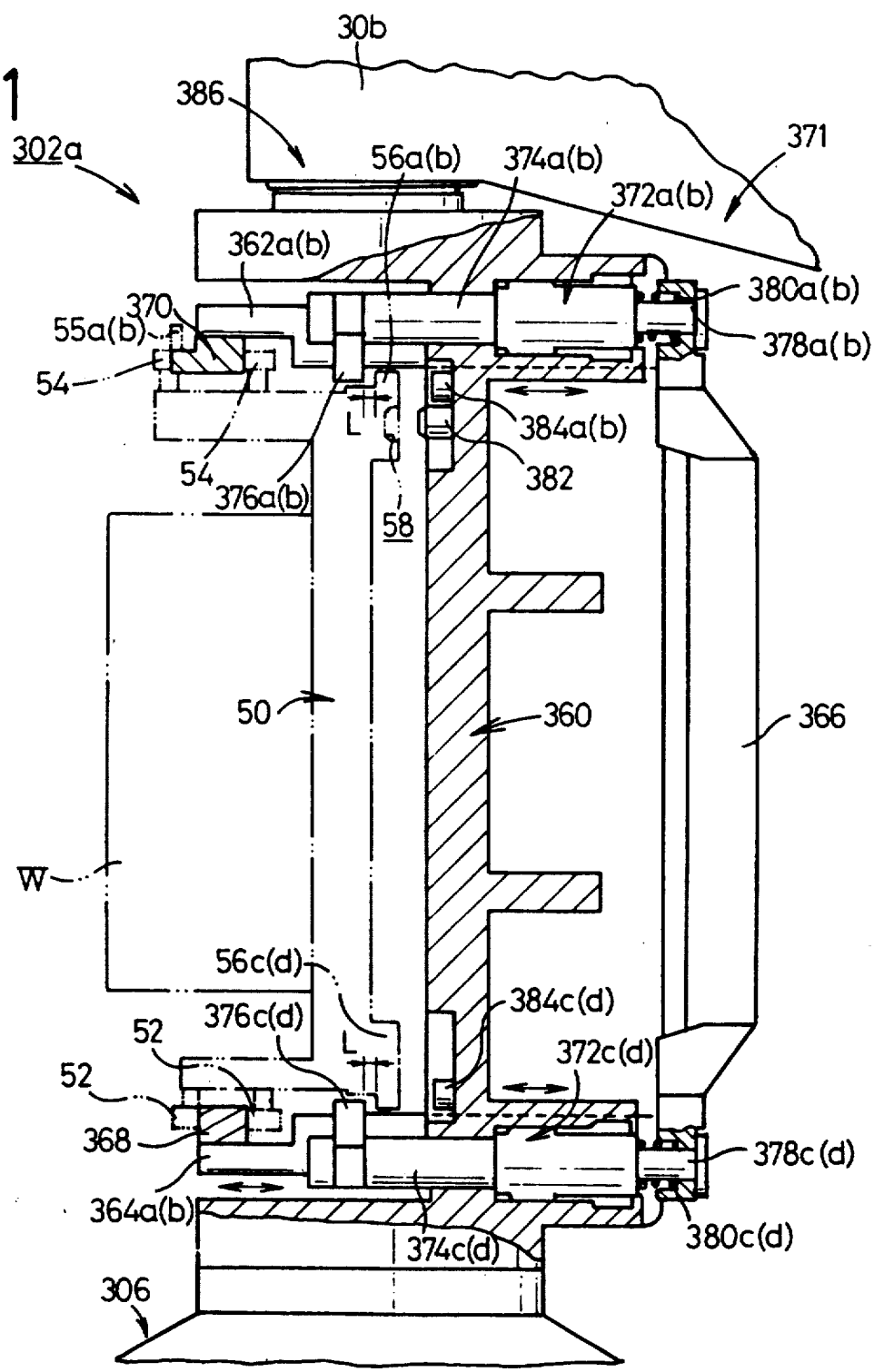
FIG. 11 is a side elevational view, partly in cross section, of the index device shown in FIG. 10 and a clamp device.

A jig body 360 is vertically disposed on the index table 306 near the post 20. As shown in FIG. 11, a pair of guide rods 362a, 362b and a pair of guide rods 364a, 364b are fitted in upper and lower portions of the jib body 360. The guide rods 362a, 362b and 364a, 364b have ends extending through the jig body 360 toward the post 20 and integrally coupled to a joint plate 366. Lower and upper rails 368, 370 are attached to the other ends of the guide rods 364a, 364b and 362a, 362b. The lower and upper rails 368, 370 have opposite end surfaces directed toward the axes of the guide rods 362a, 362b and 364a, 364b, and extending parallel to each other (see FIG. 3).

A clamp device 371 for positioning and holding a pallet 50 on the jig body 360 is mounted on the jig body 360. The clamp device 371 includes cylinders 372a through 372d which are positioned near the respective guide rods 362a, 362b and 364a, 364b. Piston rods 374a through 374d project from the cylinders 372a through 372d, respectively, away from the column 20, and fingers 376a through 376d are mounted respectively on the piston rods 374a through 374d. Piston rods 378a through 378d also project from the cylinders 372a through 372d, respectively, toward the column 20 and have ends engaging the joint plate 366. Coil springs 380a through 380d are disposed around the piston rods 378a through 378d, respectively, for normally urging the joint plate 366 in a direction away from the cylinders 372a through 372d. A positioning pin 382 and seats 384a through 384d for positioning the pallet 50 with respect to the jig body 360 are mounted on the jig body 360.

Figure 12:
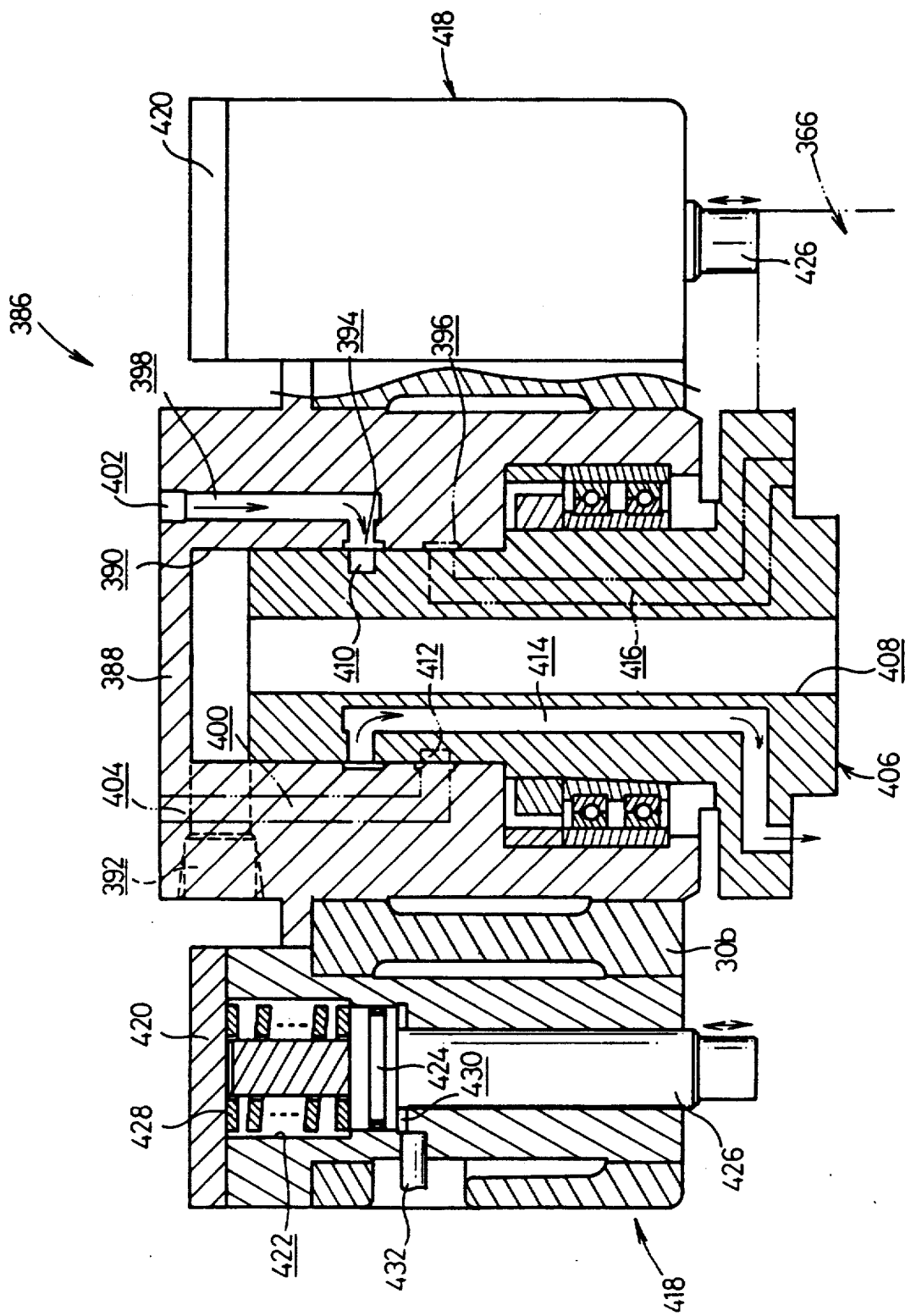
FIG. 12 is a vertical cross-sectional view of a rotary joint of the index device.

A rotary joint 386 is mounted on the fixed arm 30b above the jig body 360. As shown in FIG. 12, the rotary joint 386 has a main body 388 fixed to the fixed arm 30b. The main body 388 is of a substantially cylindrical shape having a closed upper end and defining therein a central hole 390 which communicates with a cutting fluid supply port 392 defined in an upper side wall thereof. The hole 390 is defined by an inner wall surface which has peripheral grooves 394, 396 at different heights. The peripheral grooves 394, 396 communicate with first and second oil supply ports 402, 404, respectively, through respective passages 398, 400 defined in the main body 388.

A rotatable member 406 is fitted in the hole 390 in the main body 388. The rotatable member 406 has a lower portion fitted in an upper portion of the jig body 360 which is vertically mounted on the index table 306. The lower portion of the rotatable member 406 is fixed to the jig body 360 by means of bolts or the like (not shown). The rotatable member 406 has a passage 408 of a relatively large diameter centrally defined axially therethrough. The passage 408 communicates with the cutting fluid supply port 392 for supplying a cutting fluid to a workpiece W which is being cut, through a passage (not shown) defined in the jig body 360. The rotatable member 406 also has peripheral grooves 410, 412 defined in its outer peripheral surface and communicating with the peripheral grooves 394, 396, respectively. The peripheral groove 410 communicates with one of the ports of each of the cylinders 372a through 372d in the jig body 360 through a passage 414 defined in the rotatable member 306. The peripheral groove 410 communicates with the other port of each of the cylinders 372a through 372d through a passage 416 defined in the rotatable member 406.

Positioning units 418 are mounted on the opposite sides of the main body 388. Each of the positioning units 418 includes a cylinder 420 defining therein a stepped hole 422 in which a piston 424 is slidably disposed. A rod 426 extends downwardly from the lower end of the piston 424 through the cylinder 420, and has a lower end engageable with the upper surface of the jig body 360. A spring 428 is disposed in the stepped hole 422 for normally urging the piston 424 downwardly. A pressure chamber 430 is defined between the piston 424, the rod 426, and the cylinder 420 and supplied with a fluid under pressure through a pipe 432.

The machining station 300a including the index device 302a and the clamp device 371 is constructed as described above. The other machining stations 300b through 300c is structurally identical to the machining station 300a. Those parts of the machining stations 300b through 300c which are identical to those of the machining station 300a are denoted by identical reference characters, and will not be described in detail.

As shown in FIGS. 7 and 11, a plurality of rotatable guide rollers 52 for bringing the lower rail 142 are supported on a pallet 50 which will hold a workpiece W delivered along the annular feed path 29. The guide rollers 52 are disposed on one end of the pallet 50 which will be the lower end when the pallet 50 is vertically positioned by the attitude converter 200. The other end of the pallet 50 which will be the upper end when the pallet 50 is vertically directed supports a plurality of rotatable guide rollers 54 for gripping the upper rail 110, and rollers 55a, 55b for rolling on the upper surface of the upper rail 110 and hanging the pallet 50. The reverse surface of the pallet 50 opposite to the surface which supports the workpiece W has engaging members 56a through 56d that will be engaged by the fingers 376a, 376d on the cylinders 372a through 372d of the index devices 302a through 302d.

As illustrated in FIGS. 11 and 13(a), when the cylinders 372a through 372d are in a standby position for clamping the pallet 50, the end surfaces of the fingers 376a through 376d on the piston rods 374a through 374d are spaced a distance L from the engaging surfaces of the engaging members 56a through 56d. The distance L is selected such that the engaging members 56a through 56d do not interfere with the fingers 376a through 376d when the pallet 50 is delivered along the annular feed path 29.

The reverse surfaces of the engaging members 56a through 56d which are opposite to the engaging surfaces thereof are engageable with the seats 384a through 384d, respectively. The engaging member 56a has a hole 58 defined therein for fitting engagement with the positioning pin 382.

Operation and advantages of the rotary transfer system thus constructed will be described below.

Workpieces W are successively fed along the production line 12 and arrive at the attitude converter 200 of the rotary transfer system 10. At this time, a pallet 50 has already been held by the pallet holder 206 and positioned horizontally.

After a workpiece W has been clamped on the pallet 50, the cylinder 232 is actuated to displace the piston rod 232a inwardly (to the left in FIGS. 7 and 8). The pallet holder 206 coupled to the piston rod 232a is then angularly moved upwardly about the support pins 204a, 204b. After the pallet holder 206 has thus been erected vertically, the cylinder 232 is deactivated. Now, the pallet 50 held by the pallet holder 206 has turned the workpiece W through 90°, i.e., converted the attitude thereof, thus directing the workpiece W toward the column 20. The rotative drive source 203 is then operated to rotate the rotary table 202 through 180°. The pallet holder 206, which is displaced from the center of rotation of the rotary table 202, is turned 80° around into an angular position facing the column 20 (see FIG. 7). At this time, the lower rail 142 supported on the rotary table 142 has been displaced downwardly by the cylinders 140a, 140b. Therefore, when the lower rail 142 is rotated with the rotary table 202, the lower rail 142 does not interfere with the lower fixed rails 24a, 24b.

In the attitude converter 200, as described above, the workpiece W fed along the production line 12 is first directed vertically by the pallet holder 206, and then rotated 180° onto the annular feed path 29 by the rotary table 202. Therefore, it is possible to deliver the workpiece W more efficiently and accurately onto the annular feed path 29 than with the conventional arrangement in which the workpiece W is rolled 90° over in a vertical plane and then delivered onto a feed path toward machine tools.

Then, the pallet holder/releaser 100 is actuated. More specifically, the cylinders 140a, 140b on the rotary table 202 are operated to displace the piston rods 144a, 144b upwardly. The lower rail 142 on the piston rods 144a, 144b is lifted until it is gripped by the guide rollers 52 supported on the pallet 50. The cylinder 104 supported on the fixed arm 30a by the support member 102 is operated to displace the piston rod 104a downwardly. The bracket 106 supported on the piston rod 104a is lowered with the upper rail 110 while being guided by the guide bars 108a, 108b.

At this time, the first and second rotors 116a, 116b disposed respectively in the first and second recesses 112a, 112b in the upper rail 110 are angularly positioned such that the slots 136a, 136b are registered with the first and second slots 114a, 114b, respectively, as shown in FIG. 5. Therefore, when the upper rail 110 is lowered, the rollers 55a, 55b of the pallet 50 pass through the slots 114a, 136a and 114b, 136b. When the rollers 55a, 55b are positioned above the upper rail 110 and the opposite peripheral surfaces of the upper rail 110 are gripped by the guide rollers 54, the cylinder 104 is deactivated, and the actuator 118 is operated.

When the actuator 118 is operated, the piston rod 120a is displaced in the direction indicated by the arrow in FIG. 5. The link 122 having one end coupled to the piston rod 120a is turned about the pin 124 in the direction indicated by the arrow, causing the first and second link bars 126a, 126b coupled to the other end of the link 122 to be displaced in the direction indicated by the arrows. The first link 128a is pulled in the direction indicated by the arrow by the first link bar 126a, and the first rotor 116a coupled coaxially to the first link 128a through the first rotatable shaft 130a is rotated in the direction indicated by the arrow. The first rotor 116a then closes the first slot 114a. The actuator 118 is deactivated when the first and second arcuate surfaces 132a, 134a are aligned respectively with the outer and inner peripheral surfaces of the upper rail 110. The second link 128 is pushed in the direction indicated by the arrow by the second link bar 126b, and the second rotor 116b coupled coaxially to the second link 128b through the second rotatable shaft 130b is rotated in the direction indicated by the arrow. The second rotor 116b then closes the second slot 114b until the first and second arcuate surfaces 132b, 134b are aligned respectively with the outer and inner peripheral surfaces of the upper rail 110.

When the first and second rotors 116a, 116b the upper surfaces of which lie flush with the upper surface of the upper rail 110 close the first and second slots 114a, 114b, a continuous path is formed on the upper rail 110 for the rollers 55a, 55b to roll thereon (see FIG. 6). In addition, the first arcuate surfaces 132a, 132b and the second arcuate surfaces 134a, 134b of the first and second rotors 116a, 116b are aligned with the outer and inner peripheral surfaces of the upper rail 110. Therefore, continuous paths are formed on the outer and inner peripheral surfaces of the upper rail 110 for the guide rollers 54 to roll thereon.

As described above, the lower rail 142 is elevated and the upper rail 110 is lowered until the lower and upper rails 142, 110 are positioned in circular alignment with the lower fixed rails 24a, 24b and the upper fixed rails 28a, 28b. The pallet 50 is now placed on the annular feed path 29 of the rotary transfer system 10.

When the upper rail 110 is lowered by the pallet holder/releaser 100, the engaging members 42a, 42b placed on the holder members 138a, 138b fixed to the bracket 106 are lowered with the rod 40. Therefore, the engaging members 42a, 42b grip the upper portion of the pallet 50.

The cylinder 211 of the attitude converter 200 is operated to release the pallet 50 from the clamps 210a, 210b. More specifically, when the cylinder 211 is actuated to displace the piston rod 211 downwardly, the movable plate 212 coupled to the piston rod 211a is lowered. The guide rods 216a, 216b mounted on the movable plate 212 are slidably displaced in the cylindrical portions 207a, 207b of the pallet holder 206. As shown in FIG. 9(a), the guide rod 216a has the guide groove 218a extending diametrically and having its opposite ends angularly displaced about 90° from each other, and the pin 226a is fitted in the guide groove 218a and the engaging member 226a. Therefore, upon displacement of the guide rod 216a in the direction indicated by the arrow in FIG. 9(a), the engaging member 220a is angularly moved about 90° as indicated by the arrow while being guided by the guide groove 218a and the pin 226a. The clamp 224a is therefore turned from a position perpendicular to the pallet holder 206 to a position parallel thereto (see FIG. 9(b)), and is spaced from the side of the pallet 50. The guide rod 216b also has the guide groove 218b, and the guide grooves 218a, 218b are symmetrical in shape. When the movable plate 212 is moved downwardly, therefore, the engaging member 220b is turned away from the pallet 50 while being guided by the guide groove 218b and the pin 226b.

The downward movement of the movable plate 212 causes the positioning pins 214a, 214b to be displaced out of the holes 53a, 53b in the pallet 50. The pallet 50 is now released from the pallet holder 206, and supported on the lower rail 142 and the upper rail 110.

Then, the rotative drive source 37 of the feeder 32 is actuated. The rotor 34 is rotated in the direction indicator by the arrow in FIG. 2. The pallet 50 held by the movable arm 36a is now guided by the guide rollers 52, 54 so as to be displaced along the lower rail 142 and the upper rail 110, and are moved from the lower fixed rail 24b and the upper fixed rail 28b onto the lower rail 368 and the upper rail 370. When the movable arm 36a is 90° displaced from the attitude converter 200, i.e., reaches the index device 302a in the machining station 300a, the rotative drive source 37 is deactivated.

In the machining station 300a, the cylinders 372a through 372d of the clamp device 371 are operated. More specifically, a fluid under pressure such as oil under pressure is supplied through the first port 402 in the rotary joint 386 into the passage 398. The oil under pressure is introduced through the peripheral grooves 394, 410 into the passage 414 in the rotatable member 406. The oil then flows through the non-illustrated passage in the jib body 360 into one of the ports of each of the cylinders 372a through 372d, whereupon the piston rods 374a through 374d are displaced with the fingers 376a through 376d toward the column 20. Since the engaging members 56a through 56d on the reverse side of the pallet 50 are located in the way of the fingers 376a through 376d, the pallet 50 is pulled toward the jig body 350 by the fingers 376a through 376d. The end surfaces of the engaging members 56a through 36d engage the seats 384a through 384d, respectively, and the positioning pin 382 is fitted in the hole 58, whereupon the pallet 50 is firmly and accurately positioned with respect to the jig body 360. At this time, since the pallet 50 is displaced toward the jig body 360, the pallet 50 is released from the engaging members 42a, 42b of the feeder 32.

When the pallet 50 is moved toward the column 20 by the cylinders 372a through 372d, the upper rail 370 and the lower rail 368 which hold the pallet 50 are displaced toward the column 20 by the guide rods 362a, 362b and 364a, 364b. Because the guide rods 362a, 362b, 364a, 364b are coupled to the joint plate 366, these guide rods are not tilted but kept parallel to each other, so that they can move smoothly toward the column 20. The upper rail 370 and the lower rail 368 which are held by the guide rods 362a, 362b and 364a, 364b are now translated radially inwardly toward the column 20 (see FIG. 13(b)).

In each of the positioning units 418, a fluid under pressure is supplied through the pipe 432 into the pressure chamber 430 to displace the piston 424 upwardly against the resiliency of the spring 428, so that the rod 426 joined to the piston 424 is spaced from the upper surface of the jig body 360. The indexing unit 317 and the fixing units 326a through 326d of the index device 302a are operated.

More specifically, as shown in FIG. 10, oil under pressure is supplied into the first pressure chamber 320a defined between the ring 307 and the ridge 318a of the piston 318, and the second pressure chamber 320b is evacuated, for thereby displacing the piston 318 downwardly. The first coupling 322 on the piston 318 is spaced from the second and third couplings 324, 350, and hence the index table 306 having the third coupling 350 becomes rotatable.

The chambers defined in stepped holes 330 outwardly of the pistons 332 of the fixing units 326a through 326d are supplied with a fluid under pressure to displace the pistons 332 radially inwardly into the cylinders 328 against the bias of the springs 336. Thus, the rods 334 extending from the pistons 332 are spaced from the ends of the clamp arms 342, and the clamps 346 fitted in the cavities 344 in the other ends of the clamp arms 342 are released from the bottom wall surfaces 354 which define the peripheral groove 352 in the index table 306.

Then, the rotative drive source 314 is operated to rotate the drive shaft 314a in one direction to cause the worm 316 on the drive shaft 314a to rotate the worm wheel 312 and hence the drive shaft 308. Since the splines 310 on the drive shaft 308 mesh with the splines on the spline shaft 348, the index table 306 is rotated with the drive shaft 308.

When the index table 306 reaches a predetermined angular position, the rotative drive source 314 is deactivated, and the supply of the fluid under pressure to the cylinders 418 of the positioning units 418 is stopped. Therefore, the pistons 424 are displaced downwardly under the forces of the springs 428, and the distal ends of the rods 426 extending from the pistons 424 resiliently push the upper surface of the jig body 360, thus positioning the jig body 360. The second pressure chamber 320b of the indexing unit 317 is supplied with oil under pressure and the first pressure chamber 320a is evacuated. Therefore, the piston 318 is displaced upwardly to bring the first coupling 322 into mesh with the second coupling 324 on the support table 304 and the third coupling 350 on the index table 306. The index table 306 can now be accurately indexed and fixed with respect to the support table 304.

Then, the supply of the fluid under pressure to the cylinders 328 of the fixing units 326a through 326d is stopped. The pistons 332 are displaced toward the clamp arms 342 under the bias of the springs 336, and the rods 334 of the pistons 332 push the ends of the clamp arms 342. The clamp arms 342 are turned about the pins 340 to enable the lower pressing surfaces 346a of the clamps 346 fitted in the cavities 344 39 press the bottom wall surface 354 which defines the peripheral groove 352 in the index table 306. Since the clamps 346 are movable in the semispherical cavities 344, the entire pressing surfaces 346a of the clamps 346 are slidably held in contact with the bottom wall surface 354, so that the index table 306 can firmly be held against the support table 304.

When the index table 306 is rotated into the predetermined angular position by the rotative drive source 314, the rotatable member 406 fixed to the upper portion of the jig body 360 is rotated in the hole 390 in the main body 388. Since the rotatable member 306 has the peripheral groove 410 communicating with the peripheral groove 394, the first port 402 is held in communication with the passage 414 through the peripheral grooves 394, 410 no matter how the rotatable member 406 is angularly positioned. Consequently, the oil under pressure supplied from the first port 402 is always supplied to one port of each of the cylinders 372a through 372d, so that the pallet 50 can be held on the jig body 360.

During the indexing operation, the lower rail 368 and the upper rail 370 have been displaced inwardly. Therefore, the lower rail 368 and the upper rail 370 are prevented from interfering with the lower fixed rails 24b, 24c and the upper fixed rails 28b, 28c.

After the workpiece W is indexed to a certain angular position with respect to the machining device 16a through the pallet 50 held on the jig body 360, a cutting fluid is supplied from the cutting fluid supply port 392 in the rotary joint 386 into the hole 390. The cutting fluid then flows through the passage 408 in the rotatable member 406 toward the workpiece W, thereby allowing the workpiece W to be smoothly machined by the machining device 16a.

When the machining operation on the workpiece W is completed, the supply of the cutting fluid to the cutting fluid supply port 392 is stopped, and the above process is reversed to position the jig body 360 into an angular position to release the pallet 50. More specifically, the positioning units 418 are driven to disengage the rods 426 from the upper surface of the jig body 360, and the fixing units 326a through 326d are operated to displace the rods 334 in a direction away from the clamp arms 342, which release the clamps 346 from the index table 306.

The indexing unit 317 is actuated to lower the piston 318 to move the first coupling 322 out of mesh with the second and third couplings 324, 350, after which the rotative drive source 314 is operated to rotate the drive shaft 308 in the opposite direction to the direction described above through the worm 316b and the worm wheel 312. The index table 306 reaches the pallet releasing angular position. Thereafter, the index table 306 is positioned and fixed with respect to the support table 306 by the indexing unit 317 and the fixing units 326a through 326d.

Then, the supply of the oil under pressure to the first port 402 is stopped, and oil under pressure is supplied to the second port 404 from which it is introduced into the passage 416 from the peripheral groove 412 in the rotatable member 406 through the passage 400 and the peripheral groove 396, and supplied to the other port of each of the cylinders 372a through 372d. Therefore, the piston rods 378a through 378d pull the joint plate 366 toward the jig body 360. The upper rail 370 and the lower rail 368 are displaced with the pallet 50 radially outwardly away from the column 20 through the guide rods 362a, 362b and 364a, 364b coupled to the joint plate 366. As a consequence, the lower rail 368 is aligned with the lower fixed rails 24b, 24c, and the upper rail is aligned with the upper fixed rails 28b, 28c, thus forming the annular feed path 29. Since the pallet 50 is moved radially outwardly, the upper portion of the pallet 50 is fitted between the engaging members 42a, 42b on the movable arm 36a.

The rotative drive source 37 is then driven to rotate the rotor 34 through 90° for thereby displacing the pallet 50 together with the movable arm 36a toward the machining station 300b. In the machining station 300b, the workpiece W held on the pallet 50 is machined by the machining device 16b as in the machining station 300a.

The feeder 32 is then actuated to feed the pallet 50 into the machining station 300c in which the workpiece W is machined by the machining device 16c. Thereafter, the pallet 50 is delivered to the attitude converter 200. In the attitude converter 200, the pallet holder 206 is erected, and the pallet 50 is held on the pallet holder 206 by the clamps 208a, 208b.

The pallet holder/releaser 100 is then operated The rollers 55a, 55b which hangs the pallet 50 are placed on the first and second rotors 116a, 116b, respectively, as shown in FIG. 6. The cylinder 120 of the actuator 118 is operated to displace the piston rod 120a as indicated by the arrow in FIG. 6. The first and second links 128a, 128b are now turned as indicated by the arrows by the link 122 and the first and second link bars 126a, 126b. Therefore, the first and second rotors 116a, 116b are angularly moved through a certain angle until the slots 136a, 136b are registered with the first and second slots 114a, 114b in the upper rail 110.

Then, the cylinder 104 supported on the fixed arm 30a is actuated to cause the bracket 106 to lift the upper rail 110. The holder members 138a, 138b fixed to the bracket 106 are brought into engagement with the engaging members 42a, 42b to release them from the pallet 50. At this time, the slots 136a, 136b in the first and second rotors 116a, 116b are registered with the first and second slots 114a, 114b in the upper rail 110, as described above. On upward movement of the upper rail 110, therefore, the rollers 55a, 55b on the pallet 50 pass through the slots 114a, 136a and 114b, 136b, and the guide rollers 54 are spaced from the opposite peripheral surfaces of the upper rail 110.

The cylinders 140a, 140b are operated to lower the lower rail 142 to allow the guide rollers 52 to be released from the opposite peripheral surfaces of the lower rail 142.

The pallet 50 is now held by only the pallet holder 206. Then, the rotative drive source 203 is operated to turn the rotary base 202 through 180°, and the cylinder 232 is actuated to turn the pallet holder 206 downwardly. Therefore, the engaging body 228 on the pallet holder 206 abuts against the stopper 234 on the mount table 201, whereupon the pallet 50 is positioned horizontally. Then, the workpiece W is detached from the pallet 50, and delivered along the production line 12 toward a next processing position.

When the movable arm 36a is displaced into the machining station 300a, the movable arm 36d reaches the attitude converter 200. Another pallet 50 supported on the movable arm 30d is held by the pallet holder 206 and changed in attitude, after which the workpiece W is detached from this pallet 50 and fed out onto the production line 12. Thereafter, a new workpiece W is installed on the pallet 50. Pallets 50 are held respectively on the movable arms 36a through 36d. Workpieces W supported on these pallets 50 can thus be simultaneously machined by the respective machining devices 16a through 16c in the machining stations 300a through 300c.

If there are differences in time between the machining processes in the machining devices 16a through 16c, then the efficiency of the entire machining operation is lowered. To avoid this drawback, in the machining station 300c, for example, which has a relatively short machining period of time, the workpiece W may be positioned in various different angular positions, and may be machined in different directions by the machining device 16c in such different angular positions, so that the machining times in the machining stations 300a through 300c can be substantially equalized. With this operation scheme, no undesirable wait time is required, and the overall machining operation is made efficient.

In the illustrated embodiment, workpieces W to be machined are of the same type. If workpieces W of a different type are to be machined, the pallets 50 should be replaced with pallets 50a stored in the pallet stocker 17a. More specifically, after the clamps 210a, 210b are operated to release the pallet 50 in the attitude converter 200, the released pallet 50 is stored in a pallet stocker 17b. Then, the other three pallets 50 on the annular feed path 29 are successively delivered toward the production line 12, and stored in the pallet stocker 17b. Three pallets 50a in the pallet stocker 17a are placed on the annular feed path 29, and another pallet 50a is mounted on the pallet holder 206. Now, new workpieces W can be held by the pallets 50a and machined by the machining devices.

In the rotary transfer system 10, the workpieces W supported on the respective pallets 50 are successively delivered along the annular feed path 29, and machined by the respective machining devices 16a through 16c in the machining stations 300a through 300c. The annular feed path 29 is much shorter than the conventional straight machining line, and the production line 12 can be reduced in length. The machining devices 16a through 16c may be installed in a smaller space, thus allowing the space in the production factory to be efficiently utilized.

According to the illustrated embodiment, the four pallets 50 circulate on the annular feed path 29. Even if a large number of workpieces W are to be machined, it is not necessary to increase the number of pallets 50 used, and hence the rotary transfer system 10 is highly economical. Another advantage is that since no separate return conveyor or the like for returning the pallets 50 to a workpiece loading position is required, the cost of the rotary transfer system 10 is relatively low and the rotary transfer system 10 is a space saver.

When the pallet 50 is converted from the horizontal attitude to the vertical attitude through the pallet holder 206 in the attitude converter 200, the lower rail 142 of the annular feed path 29 is elevated, and the upper rail 110 thereof is lowered. The guide rollers 52, 54 on the pallet 50 engage and grip the opposite peripheral surfaces of the lower rail 142 and the upper rail 110.

When the pallet 50 is displaced along the annular feed path 29, the pallet 50 is hung by the rollers 55a, 55b which roll on the annular feed path 29. These rollers 55a, 55b would otherwise interfere with the upper rail 110 which is lowered.

To eliminate the above shortcoming, the pallet holder/releaser 100 has the first and second slots 114a, 114b defined in the upper rail 110 for passage of the rollers 55a, 55b, and also includes the first and second rotors 116a, 116b having the slots 136a, 136b for registry with the first and second slots 114a, 114b and also having the upper surfaces lying flush with the upper surface of the upper rail 110. With the slots 114a, 136a and 114b, 136b held in mutual registry as shown in FIG. 5, the rollers 55a, 55b do not engage the upper rail 110 when the upper rail 110 is vertically displaced.

After the upper rail 110 is lowered to position the rollers 55a, 55b above the upper rail 10, the actuator 118 is operated to turn the first and second rotors 116a, 116b through a certain angle to bring the arcuate surfaces 132a, 134a and 132b, 134b into alignment with the opposite peripheral surfaces of the upper rail 110. Therefore, the upper surface of the upper rail 110 and the upper surfaces of the first and second rotors 116a, 116b jointly provide a continuous path for the rollers 55a, 55b to roll thereon, and the opposite peripheral surfaces of the upper rail 110 and the arcuate surfaces 132a, 132b and 134a, 134b jointly provide a continuous path for the guide rollers 54 to roll thereon. As a result, the pallet 50 can be fed smoothly and reliably on and along the annular feed path 29 by the feeder 32. The attitude of the pallet 50 can automatically and easily be changed between the horizontal and vertical attitudes. The workpiece W can efficiently be machined in various machining processes in the rotary transfer system 10.

The pallet 50 that has been fed along the annular feed path 29 is pulled toward the jig body 360 by the fingers 276a through 376d operated by the cylinders 372a through 372d, and is positioned by the positioning pin 382 and the seats 384a through 384d on the jig body 360. The index table 306 is turned to a predetermined angular position by the rotative drive source 314 through the worm 316 and the worm wheel 312 meshing therewith, and is thereafter positioned with respect to the support table 304 by means of the indexing units 317 which includes the first through third couplings 322, 324, 350. The workpieces W supported on the jig bodies 360 by the pallets 50 can be indexed highly accurately with respect to the respective machining devices 16a through 16c, and can be machined highly accurately by the respective machining devices 16a through 16c. The index table 306 is supported on the support table 304 through the fixing units 326a through 326d, and the upper portion of the jig body 360 is pressed by the positioning units 418. As a consequence, the jig body 360 can firmly be supported on the support table 304, so that the workpieces W can be retained in place against displacement while they are being machined by the machining devices 16a through 16c.

In this embodiment, the guide rods 364a, 364b and 362a, 362b are axially movably supported on the jig body 360, and the lower rail 368 and the upper rail 370 of the annular feed path 29 are supported on the guide rods 364a, 364b and 362a, 362b. Therefore, the pallet 50 supported on the lower and upper rails 368, 370 can be held on the jig body 360 without being spaced from the lower and upper rails 368, 370. The pallet 50 can be indexed quickly and easily, making efficient the entire machining operation on the workpiece W. Inasmuch as the lower and upper rails 368, 370 are displaced toward the jig body 360, the lower and upper rails 368, 370 do not interfere with the other components such as the lower fixed rails 24b, 24c and the upper fixed rails 28b, 28c when the index table 306 is rotated.

As shown in FIGS. 11 and 13(a), at the time the fingers 376a through 376d are in their standby position, the end surfaces of the fingers 376a through 376d and the engaging surfaces of the engaging members 56a through 56d are spaced from each other by the distance L. Therefore, when the pallet 50 is fed along a substantially arcuate path through the lower and upper rails 368, 370 of the arcuate annular path 29, the engaging members 56a through 56d are held out of interference with the fingers 376a through 376d. Accordingly, the pallet 50 that has been fed along the annular feed path 29 can reliably be held by the jig body 360 simply by spacing the fingers 376a through 376d and the engaging members 56a through 56c from each other by the distance L. The clamp device 371 is simple in structure as it comprises the cylinders 372a through 372d for moving the fingers 376a through 376d back and forth. Therefore, the clamp device 371 can be manufactured inexpensively.

With the present invention, as described above, the rotary transfer system includes an attitude converting station for supporting workpieces that have been fed along a production line on respective pallets and converting the attitude of the workpieces into a desired attitude, machining stations for machining the workpieces with radially arranged machining devices, and a feeder for feeding the workpieces along an annular feed path from the attitude converting station to the machining stations. The feed path for the workpieces is thus shortened and can feed the workpieces efficiently, and the machining devices can be placed effectively in a small space. A workpiece that has been delivered along the production line can be changed in attitude automatically and quickly. Therefore, the workpieces can efficiently be machined. In each of the machining stations, the workpiece can accurately be positioned by the pallet and hence can accurately be machined by the machining device.

Since the pallets circulate along the annular feed path, even if a large number of workpieces are to be machined, it is not necessary to provide an equal number of pallets used, and hence the rotary transfer system is highly economical.

Moreover, a rotatable rotary table is disposed between first and second feed paths, and a pallet holder which is vertically swingable is supported on the rotary table in a position spaced from the center of rotation of the rotary table. The workpiece can be vertically directed together with the pallet and positioned on the second feed path simply by clamping the workpiece, which has been fed horizontally along the first feed path, on the pallet held on the pallet holder, and then rotating the rotary table through a certain angle with the pallet holder erected. The time required to convert the attitude of the workpiece is thus shortened, and the overall machining operation is made efficient with ease.

The second feed path comprises an annular feed path composed of a plurality of upper and lower parallel arcuate guide rails, and one of the guide rails is vertically movably mounted on the rotary table of the attitude converter. With the guide rail on the rotary table being retracted back to a certain retracted position, this guide rail is prevented from interfering with the other guide rails when the rotary table is rotated.

The pallet holder has clamps for holding the pallet. Each of the clamps comprises a pair of rods axially movable back and forth by a single actuator, engaging members swingable for pressing and holding the pallet by being guided by guide grooves defined in the rods, and a positioning member for engaging the pallet when the actuator is operated. Therefore, the pallet can accurately and firmly be held in position with a simple arrangement.

When the attitude of the pallet with the workpiece mounted thereon is to be changed between horizontal and vertical attitudes, upper and lower rails positioned in the vertical attitude position and serving as the feed path are vertically movable. Rotors having slots for passage therethrough of rollers supported on the pallet are disposed on the upper rail. After the pallet has been brought into the vertical attitude, the lower rail is lifted, and the upper rail is lowered for thereby automatically placing the pallet on the feed path.

If the rotors are angularly positioned in a certain angular position when the upper rail is lowered, then the rollers on the pallet pass through the slots defined in the rotors and the upper rail and are positioned above the upper rail. Then, the rotors are rotated to form a continuous path for the rollers to roll thereon. The rollers on the pallet can now reliably engage the lower and upper rails, and the pallet can smoothly be fed along the feed path. The attitude of the workpiece can be changed more efficiently than when it is manually changed by the operator as with the conventional system. The rotary transfer system can easily be automated.

According to the present invention, moreover, there is employed a jig body which is rotatable with respect to a machining device or machine tool, and clamps are disposed for positioning and holding a pallet with a workpiece supported thereon with respect to the jig body. Rails serving as an annular feed path and supporting the pallet are movable toward and away from the jig body. The pallet can accurately and securely be held on the jig body, the workpiece supported on the pallet can be indexed highly accurately with respect to the machine tool by rotating the jig body. Since the pallet is displaced together with the rails with respect to the jig body and the pallet is not disengaged from the rails, the pallet can be easily and quickly indexed. The overall machining operation is thus made efficient.

In addition, fingers movable back and forth by an actuator are mounted on a rotatable jig body, and engaging members are fixed to a pallet which supports a workpiece and is fed along an annular feed path, the engaging members and the fingers being spaced from each other by a certain distance. When the pallet is fed along the annular feed path, the engaging members which are moved along a substantially arcuate path toward the jig body do not interfere with the fingers Therefore, the pallet fed along the annular feed path can reliably and firmly be held on the jig body with a highly simple arrangement. A clamp device for clamping the pallet on the jig body is simple in structure and can be manufactured inexpensively.

Although a certain preferred embodiment has bee shown and described, it should be understood that many changes and modifications may be made therein without departing from the scope of the appended claims.

What is claimed is:

1. A rotary transfer system comprising:
    an attitude converting station for changing the attitude of a pallet with a workpiece supported thereon in a predetermined attitude;
    at least two machining stations for machining said workpiece;
    feeder means for feeding said pallet along an annular feed path from said attitude converting station successively to said machining stations;
    said annular feed path includes upper and lower arcuate movable rails disposed in said attitude converting station and in each of said machining stations, and upper and lower arcuate fixed rails aligned with said movable rails; and
    a rotatable pallet index jig body operatively mounted at each of said machining stations, said movable rails being disposed on said pallet index jig body and being rotatable therewith, said movable rails also being movable toward and away from the center of said annular feed path for preventing said movable rails from interfering with said fixed rails when said pallet index jig body and said movable rails are rotated.

2. A rotary transfer system according to claim 1, wherein said feeder means has a plurality of arms rotatable by a rotative drive source, said arms having vertically movable engaging members for engaging said pallet to feed the pallet along said annular feed path when said rotative drive source is operated.

3. A rotary transfer system comprising:
    an attitude converting station for changing the attitude of a pallet with a workpiece supported thereon to a predetermined attitude;
    at least two machining stations for machining the workpiece;
    an annular feed path including upper and lower arcuate movable rails disposed in said attitude converting station and in each of said machining stations, and upper and lower arcuate fixed rails disposed between said attitude converting stations and each of said machining stations, said fixed rails being aligned with said movable rails for supporting the pallet from the attitude converting station to said machining stations;

feeder means for feeding the pallet along said annular feed path from the attitude converting station successively to said machining stations;

a rotatable pallet index jig body for supporting the pallet, said movable rails being disposed on said pallet index jib body for rotation therewith; and actuating means for imparting movement to said movable rails for moving said movable rails from a center of said annular feed path for preventing said movable rails from interfering with said fixed rails when said pallet index jig body and said removable rails are rotated.

4. The rotary transfer system according to claim 3, wherein said attitude converting station retrieves a workpiece from a production line, changes the attitude of the workpiece to a predetermined attitude and delivers the workpiece in the predetermined attitude to the pallet to be supported thereon in said predetermined attitude.

5. The rotary transfer system according to claim 3, and further including a column for supporting said feeder means and said annular feed path, said feeder means being rotatably mounted on said column for imparting movement to the pallet along the annular feed path.

6. The rotary transfer system according to claim 5, wherein said feeder means includes four arms spaced apart by approximately ninety degrees, each of said four arms including a distal end for supporting a pallet for movement in a radial direction relative to said column.

7. The rotary transfer system according to claim 3, wherein said actuating means is a hydraulic cylinder for imparting movement in a radial direction for selectively moving the movable rails and the pallet away from the fixed rails.

* * * * *